United States Patent
Lyons et al.

(10) Patent No.: US 10,672,085 B2
(45) Date of Patent: Jun. 2, 2020

(54) PESTICIDE DISPENSER AND SELECTION TOOL

(71) Applicant: NUFARM AMERICAS INC., Alsip, IL (US)

(72) Inventors: Tom Lyons, Palos Heights, IL (US); Brian Pike, Raleigh, NC (US); Brian Rund, Raleigh, NC (US); Jonathan Hart, Apex, NC (US)

(73) Assignee: NUFARM AMERICAS INC., Alsip, IL (US)

( * ) Notice: Subject to any disclaimer, the term of this patent is extended or adjusted under 35 U.S.C. 154(b) by 181 days.

(21) Appl. No.: 15/547,044

(22) PCT Filed: Jan. 28, 2016

(86) PCT No.: PCT/US2016/015484
§ 371 (c)(1),
(2) Date: Jul. 27, 2017

(87) PCT Pub. No.: WO2016/123414
PCT Pub. Date: Aug. 4, 2016

(65) Prior Publication Data
US 2018/0068396 A1    Mar. 8, 2018

Related U.S. Application Data

(60) Provisional application No. 62/118,761, filed on Feb. 20, 2015, provisional application No. 62/108,916, filed on Jan. 28, 2015.

(51) Int. Cl.
*G06Q 50/02* (2012.01)
*A01M 7/00* (2006.01)
(Continued)

(52) U.S. Cl.
CPC .......... *G06Q 50/02* (2013.01); *A01M 7/0046* (2013.01); *B67B 7/24* (2013.01); *B67D 7/74* (2013.01)

(58) Field of Classification Search
CPC ............ G06Q 50/02; B67D 7/74; B67D 7/24; A01M 7/0046
(Continued)

(56) References Cited

U.S. PATENT DOCUMENTS 4,088,246 A    5/1978  Klingaman
4,671,435 A *  6/1987  Stout .................. A01M 1/2044
                                              222/646

(Continued)

FOREIGN PATENT DOCUMENTS

WO    WO2013116706    8/2013

OTHER PUBLICATIONS

International Preliminary Report on Patentability for International Application No. PCT/US2016/015484 dated Mar. 29, 2017.
(Continued)

*Primary Examiner* — Michael Collins
(74) *Attorney, Agent, or Firm* — Neal, Gerber & Eisenberg LLP; Bradley Rademaker; Nawshaba Siddiquee

(57) ABSTRACT

Systems and methods for mixing, storing, and dispensing pesticides, and guiding a user to an appropriate pest solution, are provided. One pesticide dispensing system includes a portable container comprising an opening configured to receive a pack having a predetermined size and shape, the pack containing a concentrated pesticide. The system further includes a piercing unit to create a hole in the pack for dispensing the pesticide into the container via the opening. Embodiments also include a pest solution selection kiosk comprising a display for displaying a first set of prompts for selection of a pest solution and receiving a touch input
(Continued)

representing user selection of a prompt; a processor for identifying second prompts based on the user selection and stored pest solution criteria and identifying a pest solution product based on user-selection of the second prompts. The display presents information about the selected product and/or a dispense option.

19 Claims, 25 Drawing Sheets

(51) Int. Cl.
*B67D 7/74* (2010.01)
*B67B 7/00* (2006.01)

(58) Field of Classification Search
USPC .................................................. 700/231–244
See application file for complete search history.

(56) References Cited

U.S. PATENT DOCUMENTS

| | | | | |
|---|---|---|---|---|
| 6,610,254 | B1 * | 8/2003 | Furner | A01M 1/2033 222/183 |
| 7,610,118 | B2 * | 10/2009 | Schramm | A01M 1/2033 239/69 |
| 8,459,499 | B2 * | 6/2013 | Sipinski | B65D 83/262 222/1 |
| 2005/0224596 | A1 * | 10/2005 | Panopoulos | A01M 1/2038 239/67 |
| 2009/0005247 | A1 * | 1/2009 | Spiegel | A01N 25/00 504/116.1 |
| 2009/0308889 | A1 | 12/2009 | Lindsay et al. | |
| 2010/0163578 | A1 | 7/2010 | Mueller et al. | |
| 2010/0268679 | A1 | 10/2010 | Anderson | |
| 2012/0046837 | A1 | 2/2012 | Anderson | |
| 2015/0187026 | A1 * | 7/2015 | Holman | G06Q 30/0621 705/15 |
| 2015/0353236 | A1 * | 12/2015 | Gentile | B65D 25/205 235/375 |

OTHER PUBLICATIONS

International Search report/Written Opinion for International Application No. PCT/US2016/015484 dated Jun. 3, 2016.

* cited by examiner

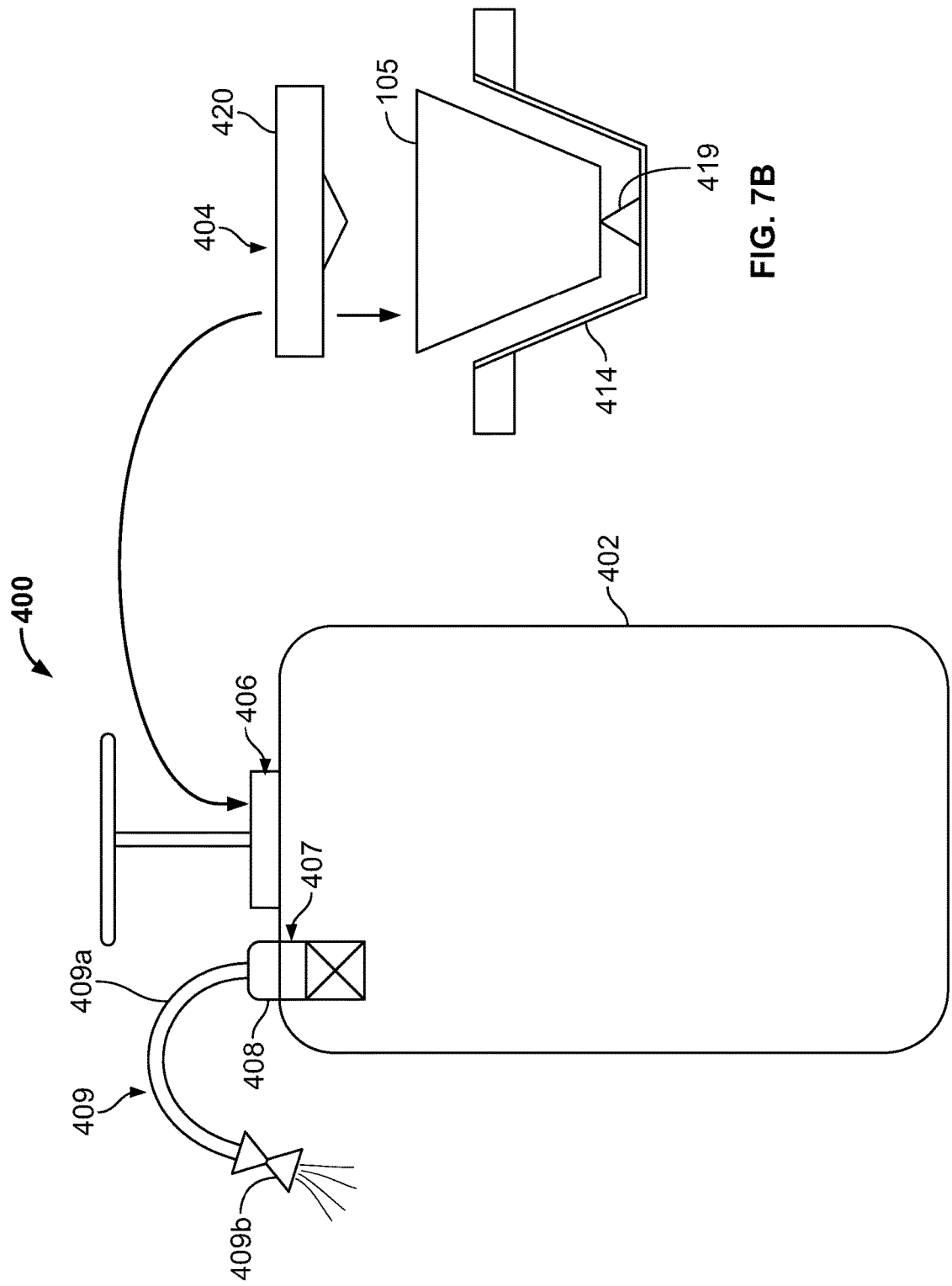

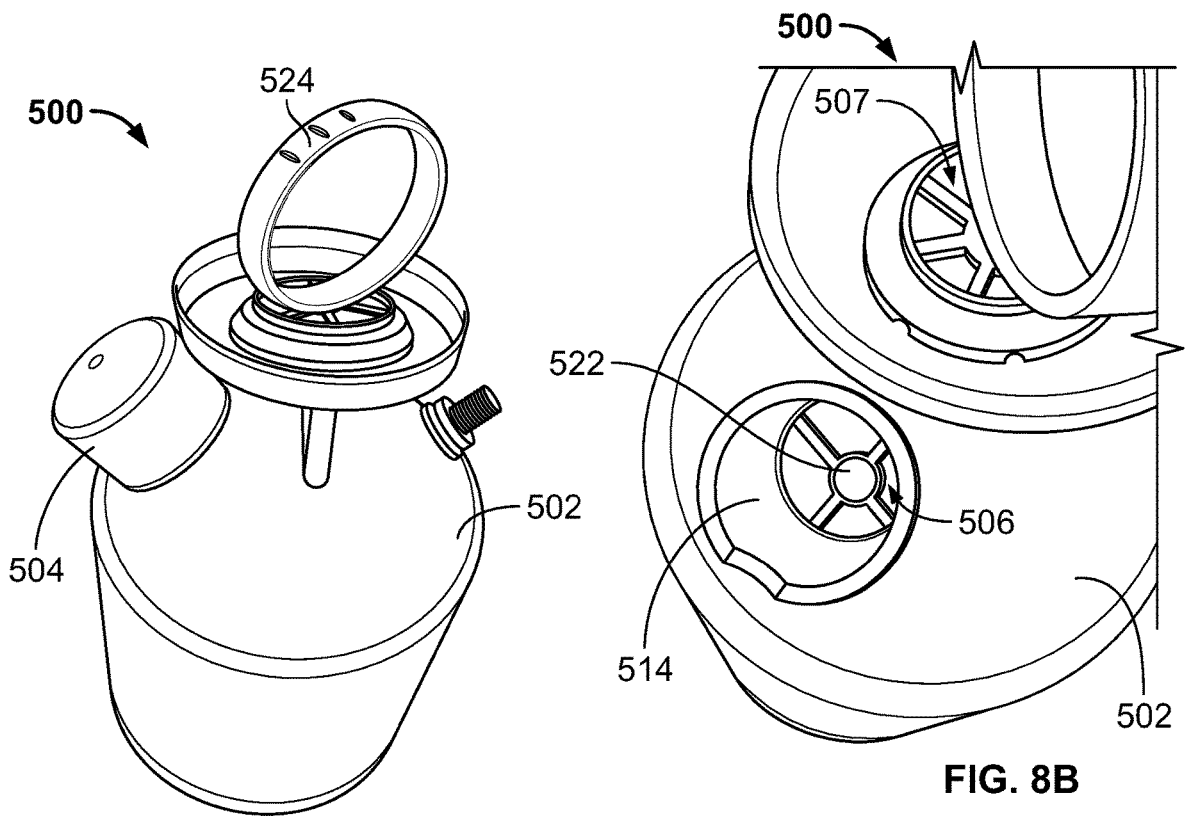
FIG. 8A
FIG. 8B
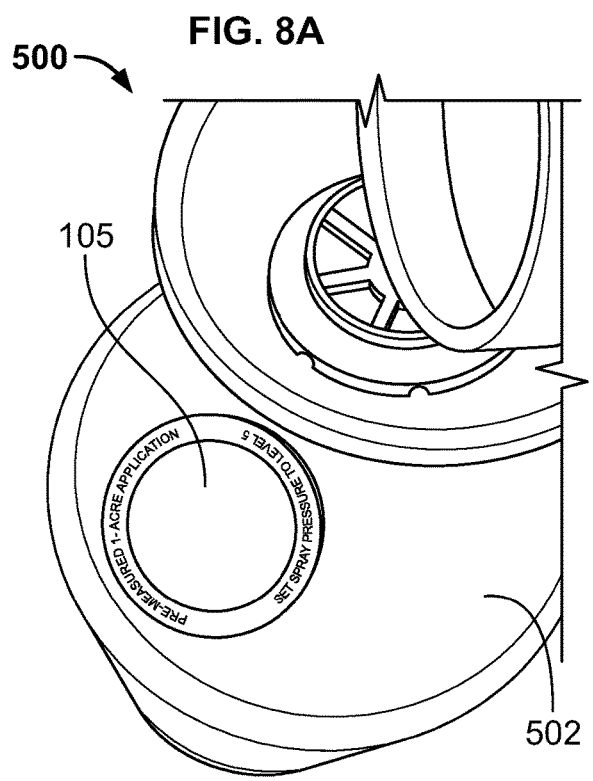
FIG. 8C
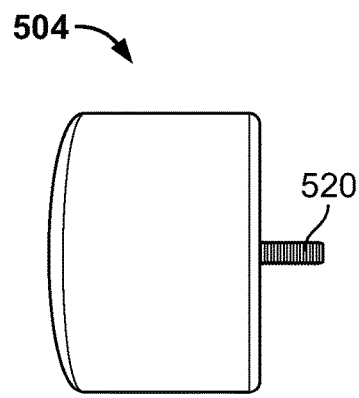
FIG. 8D

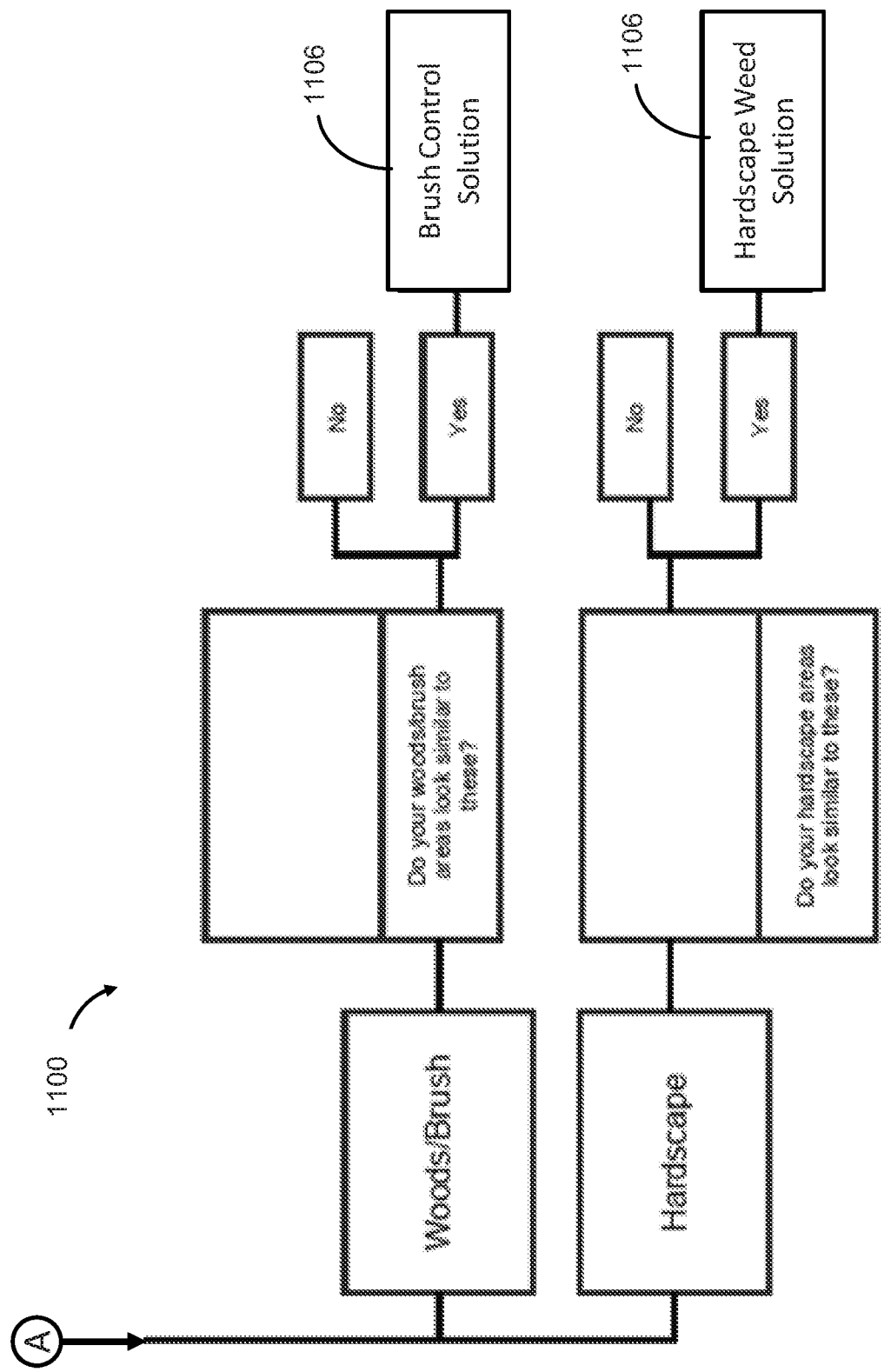

PESTICIDE DISPENSER AND SELECTION TOOL

CROSS-REFERENCE

This is a national stage application of international Application No. PCT/US2016/015484, filed on Jan. 28, 2016 and entitled "PESTICIDE DISPENSER AND SELECTION TOOL." This application claims benefit of U.S. Provisional Application Ser. No. 62/108,916 filed on Jan. 28, 2015 and U.S. Provisional Application Ser. No. 62/118,761 filed on Feb. 20, 2015. The contents of all three prior applications are incorporated by reference herein in their entirety.

BACKGROUND OF THE INVENTION

The description that follows relates to pesticide dispensers and selection tools for guiding a user to an appropriate pest solution.

Pesticides are chemical or biological agents or substances designed to attract, destroy, kill, incapacitate, mitigate, and/or discourage one or more pests, including weeds, plant diseases, insects, or microorganisms (including bacteria, viruses, and other organisms that can cause plant diseases). As used herein, the term pesticide includes at least one of herbicide, insecticide, insect growth regulator, nematicide, termiticide, molluscicide, piscicide, avicide, rodenticide, predacide, bactericide, insect repellant, other types of repellant, fungicide, algaecide, miticide, fumigants, pheromone, antimicrobial, and disinfectant or sanitizer.

Commercially-available pesticides are typically sold in plastic containers in either ready-to-use form or in concentrated amounts that are mixed with water before application. Some containers, including ready-to-use containers, have a spraying device for spraying the pesticide onto problem areas directly from the container. With concentrated pesticides, some containers include a hose attachment for attaching the container to a garden or other water hose and thereby, depositing water into the container to mix with the pesticide concentrate. In some containers, the hose is attached to the container for application, and the pesticide concentrate may be diluted while being sprayed out from the container. In other cases, the concentrated pesticide must be poured from the pesticide container into a separate sprayable container and mixed with water therein.

Drawbacks of these and other existing products can include, for example, the creation of plastic waste and the challenge of safely disposing used, or partially-used, pesticide containers. Further, because most pesticide formulas are specifically targeted towards one or more problems, the user will likely purchase several different pesticide containers to address various indoor and outdoor areas. In such cases, the user is left with the problem of allocating storage space for the multiple containers and/or arranging for proper disposal of each container once its contents have been depleted.

Another drawback of existing products is the difficulty of locating appropriate pesticide product(s) for a given problem. Customers can be easily frustrated and/or overwhelmed when faced with a wall of shelves displaying various pesticides that are formulated according to one or more variables, including, for example, the affected area/location, type of problem(s), type of pest(s), seasonal restrictions, geographical restrictions, regulatory restrictions, etc. To identify the appropriate product, customers typically scan the shelves and at least briefly read each product label or try to locate store personnel to seek their assistance. Either option can be time-consuming and/or imprecise, especially if the customer (and/or store personnel) is inexperienced or unfamiliar with pesticide products.

In some cases, the customer (and/or store personnel) may not be aware of all the variables that should be considered when selecting a pesticide, such as, for example, seasonal restrictions that can limit usage of a pesticide to specific dates, or regulatory restrictions that can vary between neighboring states, counties, cities, postal zip codes, or other geographical zones. For example, current regulations pertaining to pesticide use for the state of New York differ from regulations for the state of New Jersey. Residents near the New Jersey/New York border may regularly crisscross state lines for work, dining, shopping, and other common activities, but may not be aware of the differences in pesticide regulations. As such, customers may inadvertently purchase a product that is approved for the store's regulatory zone, for example, but is restricted in the customer's neighborhood. As another example, customers may buy a product in the spring and continue to use that product throughout the summer, not knowing that the seasonal regulations for the product prohibit use after June $15^{th}$. Also, government approval for the use/sale of a given pesticide, also known as a pesticide product registration, can "expire" or change with time if, for example, the manufacturer fails to renew the product registration within an allotted time frame, or if regulations affecting the pesticide are revised or repealed. As a result, even if one or more of the seasonal, regulatory, or geographical restrictions are pre-printed on a label affixed to the pesticide product at the time of manufacturing, the printed restrictions may no longer be up-to-date or valid by the time a consumer purchases the product.

SUMMARY OF THE INVENTION

Apparatus for mixing, storing, and/or dispensing pesticides are disclosed herein. Embodiments include a pesticide dispenser comprising a portable container with an opening configured to receive a pack having a predetermined size and shape, where the pack contains a concentrated pesticide. The pesticide dispenser can further include a piercing unit configured to create a hole in the pack for dispensing the concentrated pesticide into the container via the opening, and a fastener coupled to the container and configured for attachment to a liquid dispensing unit, the liquid dispensing unit configured to dispense a liquid comprising a fluid mixed with the concentrated pesticide.

Embodiments also include an adapter for use with a liquid dispenser, the adapter comprising a chassis configured for removable attachment to an opening of the liquid dispenser. The adapter also includes a top cap configured for removable attachment to the chassis and for removably sealing the opening of the liquid dispenser. The adapter also includes a piercing unit configured to create at least one hole in a pack containing a concentrated pesticide, the pack having a predetermined size and shape configured to fit within the chassis.

Also disclosed herein are systems and methods for guiding a user to an appropriate pest solution. Embodiments include a pest solution dispensing machine comprising a user interface comprising a display in communication with a processor, said display being configured to display a first set of prompts related to selection of a pest solution; said user interface being configured to receive user selection of at least one of the displayed prompts; said processor being configured to identify a selection of one or more pests based on the user selection and identify a second set of prompts, wherein said second set of prompts is displayed on said display and said user interface is configured to receive user selection of at least one of said second set of prompts; a memory in communication with the processor and configured to store pest solution criteria, the processor determining the second set of prompts based on the stored pest solution criteria; a plurality of different pest solution products; and a product dispenser in communication with the processor and configured to dispense a pre-packaged amount of a selected one of the pest solution products, the selected product being identified by the processor based on a user-selected one of the second set of prompts.

Embodiments also include an electronic device comprising a display configured to display a first set of prompts related to selection of a pest solution and to receive a touch input representing user selection of at least one of the displayed prompts; a processor in communication with the display and configured to identify a second set of prompts based on the user selection, wherein at least one of said first, and second set of prompts includes photographic images relating to a choice of potential pests for treatment; and a memory in communication with the processor and configured to store pest solution criteria, the processor determining the second set of prompts based on the stored pest solution criteria. The processor is further configured to identify a selected one of a plurality of pest solution products based on a user-selected one of the second set of prompts. The display is further configured to display information about the selected product, wherein said selected pest solution product, is at least one of a group of pre-packaged uniformly sized and shaped packs containing a pesticide.

Example embodiments further include a computer-implemented method for guiding a user to an appropriate pest solution using a processor, a memory, and a user interface. The method includes obtaining location information for a treatment area in need of a pest solution; displaying, on the user interface, one or more user prompts for requesting information regarding the treatment area, the one or more user prompts including at least one photographic image relating to at least one pest for treatment; based on the location information, retrieving, from the memory, usage restriction information associated with the treatment area; determining, by the processor, a recommended pest solution based on the information received in response to the one or more user prompts, the usage restriction information, and a product availability; and displaying, on the user interface, the recommended pest solution.

Another example embodiment includes an electronic device comprising a user interface having a display configured to display a first set of prompts related to selection of a pest solution, and said user interface being configured to receive a user first selection of at least one of the displayed prompts; a processor in communication with the user interface and configured to identify a second set of prompts based on said user first selection, said user interface being configured to display said second set of prompts on the display and receive a user second selection of at least one of the displayed second set of prompts; wherein at least one of said first and second set of prompts includes an identification of potential pests for treatment, the identification including photographic images; a memory in communication with the processor and configured to store pest solution criteria, the processor determining a selection of at least one pest solution product based on at least one of said user first and second selections and based on the stored pest solution criteria, said user interface being configured to display information about said at least one pest solution product on the display, and to receive a user selection in response to said display of product.

Another example embodiment includes a system comprising a user interface having a display configured to display a first set of prompts related to selection of a pest solution, said user interface being configured to receive a first user selection of at least one of the displayed prompts; a processor in communication with the user interface and configured to identify a second set of prompts based on said first user selection, said user interface being configured to display said second set of prompts on the display and receive a second user selection of at least one of the displayed second set of prompts, wherein at least one of said first and second set of prompts includes an identification of potential pests for treatment, said identification including photographic images; at least one memory in communication with the processor and configured to store pest solution criteria, said processor determining a selection of at least one pest solution product based on at least one of said first and second user selections and based on the stored pest solution criteria, said user interface being configured to display information about said at least one pest solution product on the display, and to receive a user selection in response to said display of product.

A better understanding of the invention will be obtained from the following detailed descriptions and accompanying drawings, which set forth illustrative embodiments that are indicative of the various ways in which the principals of the invention may be employed.

BRIEF DESCRIPTION OF THE DRAWINGS

FIG. 7A is a front view of a fourth example embodiment of a pesticide dispenser;

FIG. 7B is a front view of a pack receiving portion of the pesticide dispenser shown in FIG. 7A, in accordance with embodiments;

FIG. 8A is a front perspective view of a fifth example embodiment of a pesticide dispenser;

FIG. 8B is a partial perspective view of the pesticide dispenser shown in FIG. 8A without a pesticide pack in place, in accordance with embodiments;

FIG. 8C is a partial perspective view of the pesticide dispenser shown in FIG. 8B with a pesticide pack in place, in accordance with embodiments;

FIG. 8D is a side plan view of an example piercing unit for coupling to the pesticide dispenser shown in FIG. 8C, in accordance with embodiments;

FIGS. 14A through 14D depict a flow diagram of an example sequence for guiding a user to an appropriate pest solution in accordance with embodiments.

Figure 1A:
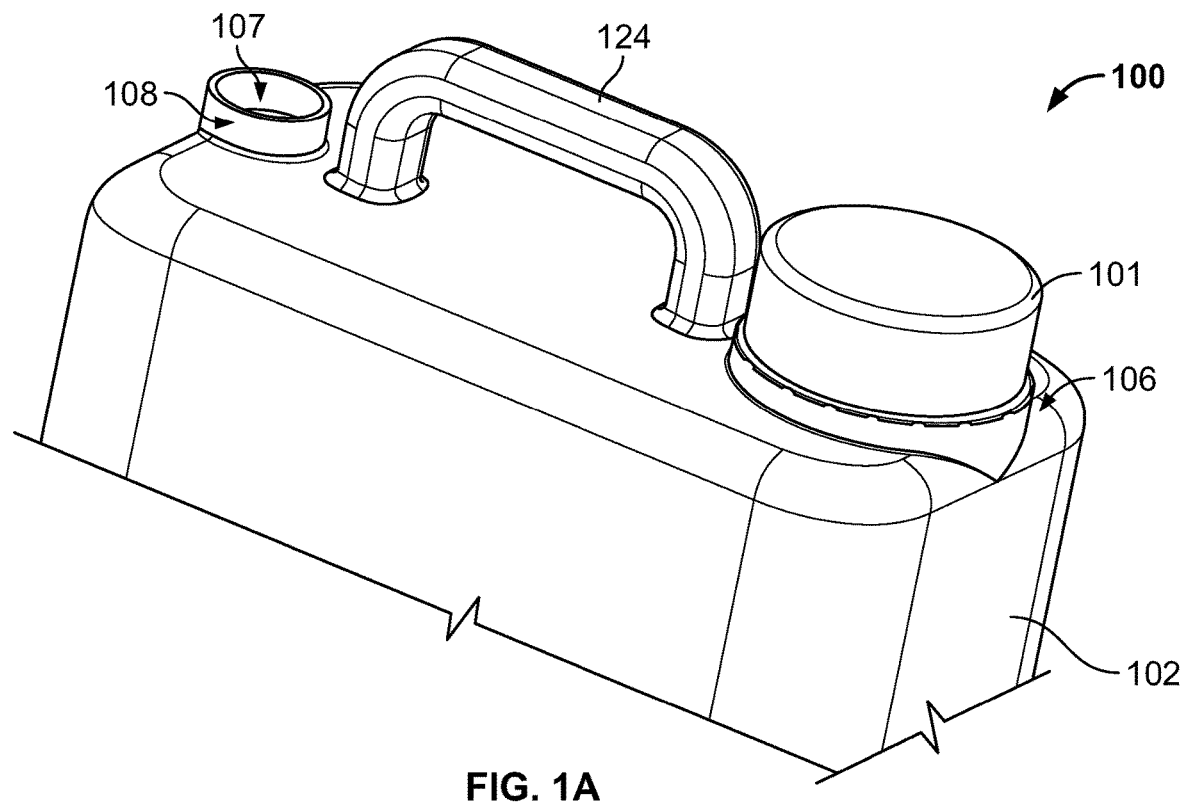
FIG. 1A is a side perspective partial view of a first example embodiment of a pesticide dispenser, in accordance with embodiments.

Illustrative and exemplary embodiments of the invention are described in further detail below with reference to and in conjunction with the figures.

DETAILED DESCRIPTION

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIGS. 1A-ID depict an example pesticide dispensing system 100 (also referred to herein as a "pesticide dispenser") for mixing, storing, and/or dispensing a pesticide, in accordance with embodiments. As shown, the pesticide dispenser 100 can include a top cap 101, a container 102 for holding a liquid, and a piercing unit 104 for puncturing a pack 105 comprising a pesticide or other type of substance. In embodiments, the substance in the pack 105 is a concentrated pesticide specifically formulated to address one or more problems and/or areas (e.g., lawn, garden, patio, ants, termites, etc.). The substance can be in the form of loose, dry particles (such as, e.g., a powder), a condensed liquid, a gel, or any other suitable form. The container 102 includes an opening 106 configured to receive the pack 105 and the piercing unit 104 and to allow access to inside the container 102, for example, to allow the substance inside the pack 105 to enter the container 102.

In some embodiments, the container 102 can also include a second opening 107 configured to provide access to inside the container 102, for example, to allow a liquid to enter and/or exit the container 102. The second opening 107 can include a fastener 108 configured for attachment to a liquid dispensing unit (such as, e.g., liquid dispensing unit 409 shown in FIG. 7A), or a spray wand. For example, the liquid dispensing unit can include a hose (such as, e.g., hose 409a in FIG. 7A) for carrying a liquid into and/or out of the container 102, via the second opening 107, and a spraying device (such as, e.g., spraying device 409b in FIG. 7B) for spraying or otherwise dispensing a liquid stored inside the container 102. In embodiments, the spraying device can be configured to have multiple sprayer settings for controlling the flow of liquid dispensed through the liquid dispensing unit. A second cap (not shown) may be coupled to the fastener 108 to secure the second opening 107 and prevent liquid from spilling out of the container 102 when the liquid dispensing unit is not coupled to the second opening 107.

In an example use case, the pack 105 is placed into the opening 106 and punctured by the piercing unit 104, in order to empty its contents through the opening 106 into the container 102. The container 102 can be filled with a liquid or fluid (e.g., water) to mix with the pesticide emptied from the pack 105. The liquid and pesticide may combine to form a homogeneous mixture (e.g., a solution), a heterogeneous mixture (e.g., a suspension), or any other type of mixture depending on the characteristics of the pesticide and/or the liquid, as will be appreciated.

The liquid-pesticide mixture can be dispensed from the container 102 through the liquid dispensing unit attached to the second opening 107. In some embodiments, once the pack 105 is positioned within the opening 106 and punctured by the piercing unit 104, any liquid passing through the opening 106 will also pass through the pack 105 and in the process, dilute, dissolve, or otherwise mix with the contents of the pack 105. Depending on the specific configuration of the pesticide dispenser 100, this mixing can occur as the liquid is exiting the container 102, for example, while the liquid-pesticide mixture is being dispensed by the liquid dispensing unit, and/or as the liquid is entering the container 102, for example, while the container 102 is being filled with water through the opening 106. In either case, the pack 105 may be sufficiently washed out during passage of the liquid in order to satisfy governmental rules and/or environmental regulations that require containers once containing hazardous materials to be sufficiently cleaned as to have minimal residues remaining.

In embodiments, the container 102 can be filled with liquid through the opening 106 and/or the second opening 107. In some embodiments, the container 102 only includes the opening 106 (e.g., does not include the second opening 107), and the liquid dispensing unit is coupled to the opening 106 (instead of the second opening 107). In such embodiments, both the liquid and the pesticide can enter and exit the container 102 through the opening 106. For example, in one embodiment, the liquid dispensing unit can be removed from the opening 106 in order to place the pack 105 into the opening 106. Then, all or a portion of the liquid dispensing unit can be re-attached to the opening 106 depending on how the container 102 is configured for water-filling.

In some such embodiments, the hose of the liquid dispensing unit may be attached to the opening 106 during water-filling, so that the hose can be used to fill the container 102 with a liquid, for example, by coupling the hose to an external water source, such as, e.g., a garden hose. In such cases, once the container 102 is sufficiently filled, the spraying device of the liquid dispensing unit can be re-attached to the hose, and the liquid dispensing unit can be used to dispense the liquid-pesticide mixture inside the container 102.

In other such embodiments, the entire liquid dispensing unit may be removed from the opening 106, and the liquid may be poured directly into the opening 106 from an external water source, such as, e.g., a pitcher, a garden hose, or a faucet. Once the container 102 is sufficiently filled, the whole liquid dispensing unit may be re-attached to the opening 106 and used to dispense the liquid-pesticide mixture within the container 102.

In other embodiments, the container 102 may be configured to both receive and dispense liquid through the second opening 107 and to only receive the pesticide in the pack 105 through the opening 106. For example, in some cases, the liquid dispensing unit may be used to fill the container 102 by removing the spraying device from the hose and attaching the hose to an external hose that is coupled to a water source. In other cases, to fill the container 102 with liquid, the entire liquid dispensing unit may be removed from the second opening 107, and an external water hose may be coupled thereto instead.

In some embodiments, the second opening 107 and the liquid dispensing unit are only used for dispensing liquid from the container 102. In such cases, the container 102 can be filled with liquid through the opening 106, for example, by coupling an external water hose thereto or by pouring water into the opening 106 from an external water source (e.g., a bottle, jug, faucet, etc). In still other embodiments, the container 102 is filled with liquid through a third opening (not shown) that is dedicated for such filling, the second opening 107 being used for dispensing liquid from the container 102 and the opening 106 being used for receiving the pesticide via the pack 105.

Figure 1B:
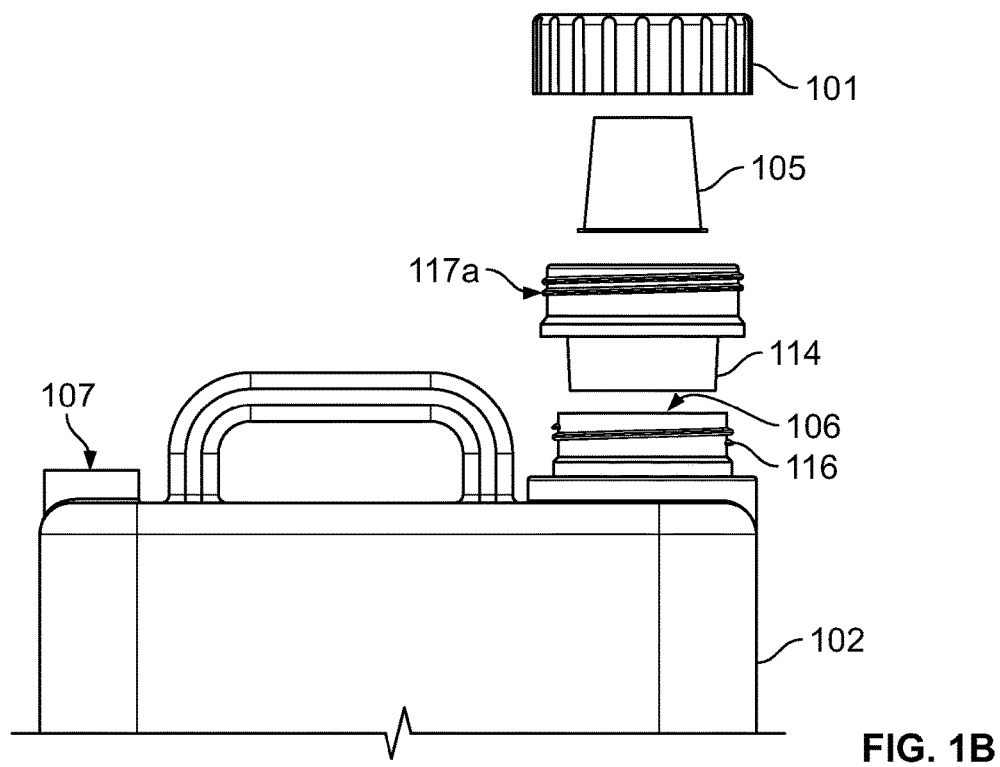
FIG. 1B is an exploded partial view of the pesticide dispenser shown in FIG. 1A, in accordance with embodiments.
Figure 1C:
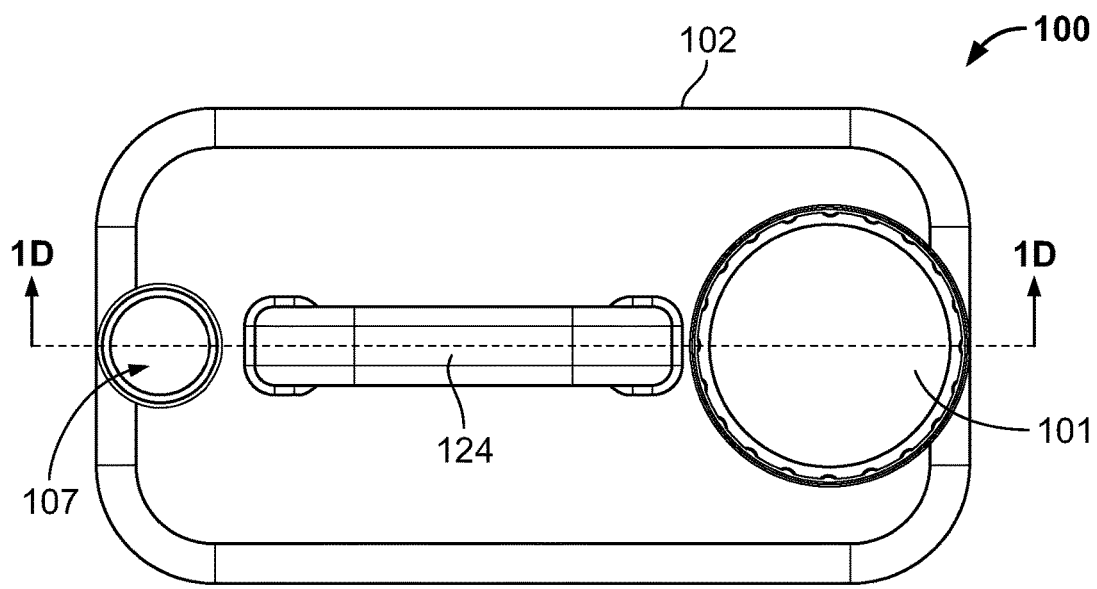
FIG. 1C is a top plan view of the pesticide dispenser shown in FIG. 1A, in accordance with embodiments.

In embodiments, the pack 105 can have a predetermined size and shape that may be standardized regardless of its contents, so that each type of pack 105 can be interchangeably used with the same dispenser 100. FIGS. 1A and 1B depict example pack 105 with a cup portion 110 for holding a pre-measured amount of concentrated pesticide that is capable of covering a given application area (e.g., one acre) once mixed with an appropriate amount of water or other liquid (e.g., 2 liters). In embodiments, the pack 105 can be pre-filled with any type of pesticide, including, for example, herbicides, insecticides, rodenticides, etc. As a result, the same dispenser 100 can be used to dispense any of a number of different pesticides, so long as the pesticide is provided in the form of pack 105. An outer packaging of the pack 105 can include printed labels identifying the specific contents of the pack 105 and instructions to assist the user with proper application (e.g., amount of liquid required, application area covered, sprayer setting, etc.).

In other embodiments, the pack 105 can have certain diameters or sizes to represent certain types of pesticides, to help the user easily discern between different types of packs. For example, the pack 105 may have a two-inch diameter for herbicides, and a one-inch diameter for insecticides. In such cases, a rose sprayer, for example, can easily tell that they picked the wrong "cup" or pack 105 before starting the application. To accommodate the different sized packs, the pesticide dispenser 100 may have different sized openings 106 or different-sized adapters (e.g., chassis 114) to accommodate each size.

Figure 2A:
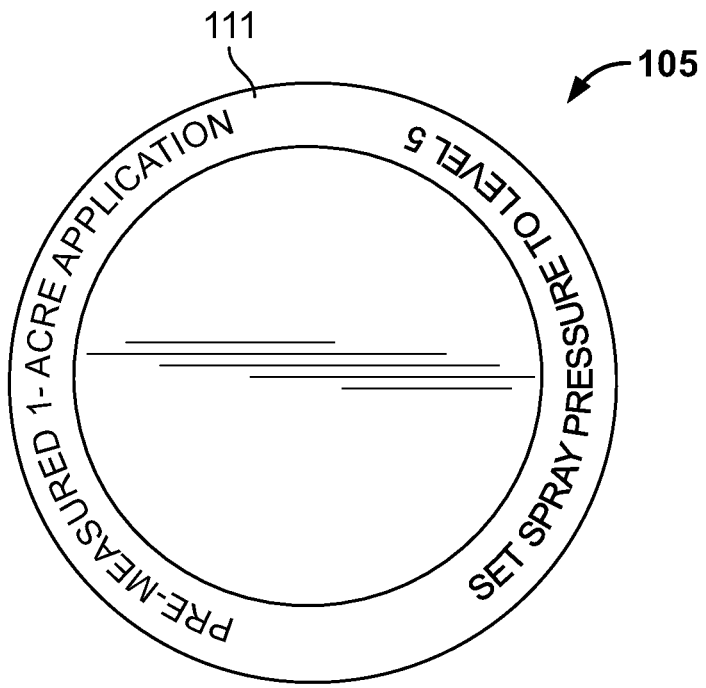
FIG. 2A is a top plan view an example pesticide concentrate pack, in accordance with embodiments.
Figure 2B:
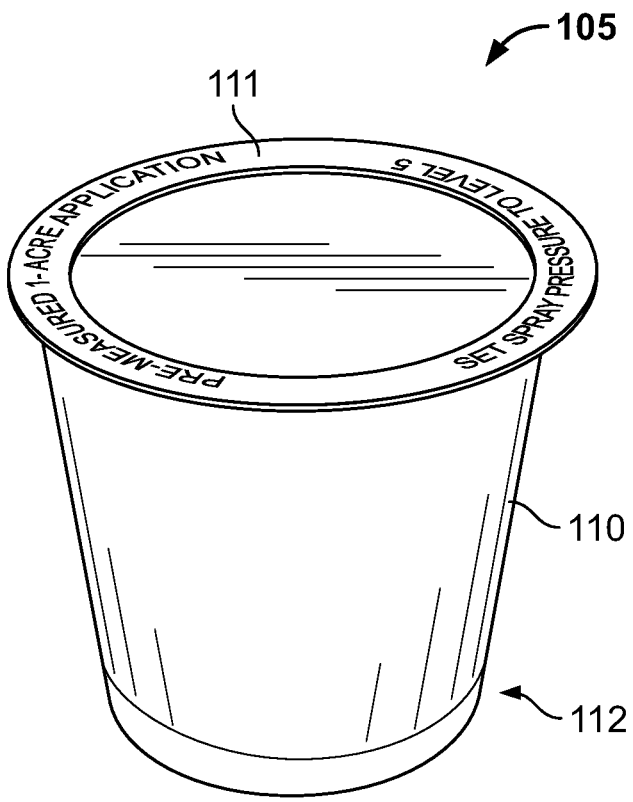
FIG. 2B is a perspective view of the pesticide concentrate pack shown in FIG. 2A, in accordance with embodiments.

In FIGS. 1B and 2B, the pack 105 is depicted as having a generally cylindrical, cup-like shape that tapers from top to bottom, such that, for example, a top surface 111 of the pack 105 has a larger diameter than a bottom surface 112 of the pack 105. In the illustrated embodiment, the top surface 111 and the bottom surface 112 are shown as being substantially flat surfaces. In other embodiments, the top surface 111 and/or the bottom surface 112 may be rounded, curved, or otherwise non-planar. In some embodiments, the pack 105 may have any other three-dimensional shape capable of holding the pesticide substance, such as, for example, ovoid, rectangular, cubic, spherical, and the like.

In embodiments, the exact size and shape of the pack 105 can depend on the size and shape of the opening 106 in the container 102, or vice versa. For example, in some embodiments, the opening 106 has a height and width (or diameter) that is similar to the height and width (or diameter) of the cup portion 110 of the pack 105, so that the pack 105 can fit snugly into the opening 106. In some cases, to accommodate, for example, the pack 105, the opening 106 of the container 102 may be tapered from top to bottom like the pack 105. For example, a top portion of the opening 106 may have a diameter that is similar to a diameter of the top surface 111 of the pack 105, and a bottom portion of the opening 106 may have a diameter that is similar to a diameter of the bottom surface 112 of the pack 105. In some cases, a sidewall of the opening 106 may be angled and/or tapered like a sidewall of the cup portion 110 of the pack 105.

The pesticide dispenser 100 is configured to puncture the pack 105 with the piercing unit 104, once the pack 105 is placed into the opening 106. In that regard, the pack 105 may be at least partially constructed of a piercable material, including, for example, paper, plastic, and/or aluminum foil. In some cases, the top surface 111 of the pack 105 may be constructed of a first material, and the cup portion 210 may be constructed of a second material, where the first material is easier to puncture than the second material. For example, the top surface 111 of the pack 105 may be constructed of a thin sheet of aluminum foil, and the cup portion 110 of the pack 105 may be constructed of a sturdier plastic. In some cases, the top surface 111 may be constructed of a single sheet of material that is attached to the cup portion 110 using adhesive or any other suitable means.

Figure 3A:
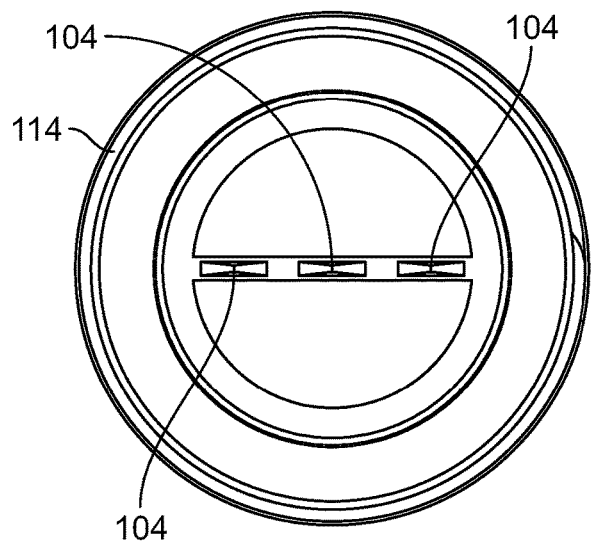
FIG. 3A is a top plan view of an example piercing unit of the pesticide dispenser shown in FIG. 1B, in accordance with embodiments.
Figure 3B:
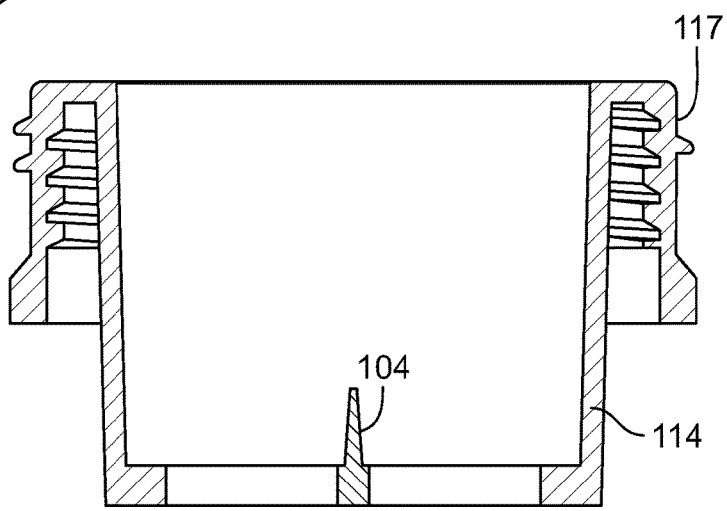
FIG. 3B is a side cross-sectional view of the piercing unit shown in FIG. 3A, in accordance with embodiments.
Figure 3C:
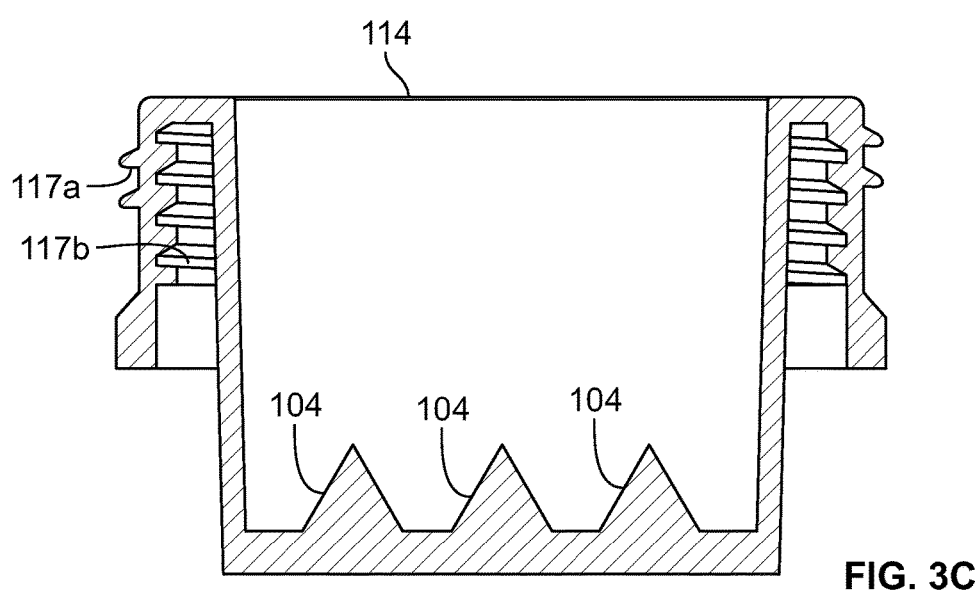
FIG. 3C is a front cross-sectional view of the piercing unit shown in FIG. 3A, in accordance with embodiments.
Figure 4A:
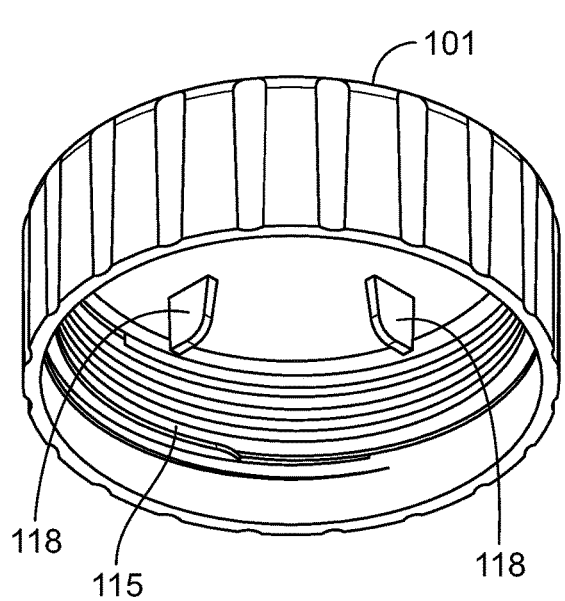
FIG. 4A is a perspective view of an example cap of the pesticide dispenser shown in FIG. 1B, in accordance with embodiments.
Figure 4B:
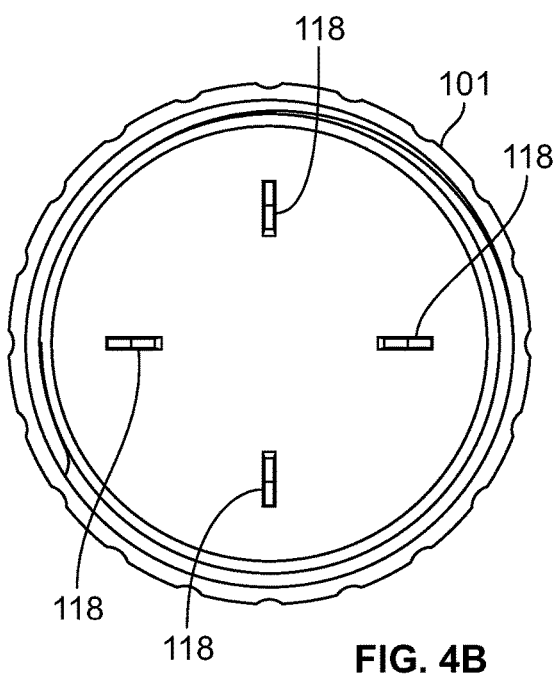
FIG. 4B is a bottom plan view of the cap shown in FIG. 4A, in accordance with embodiments.
Figure 4C:
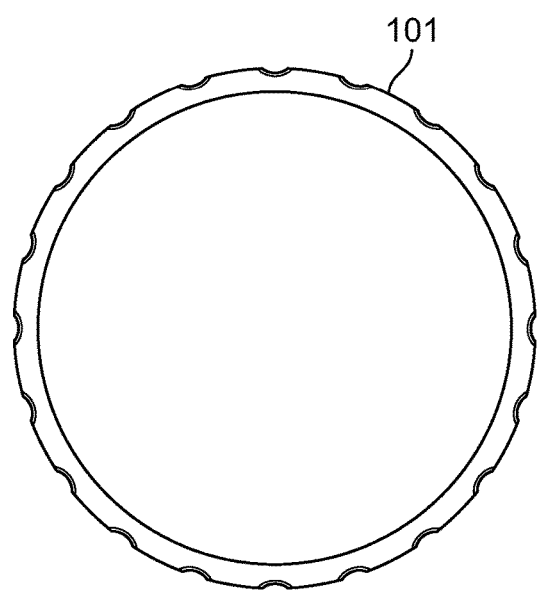
FIG. 4C is a top plan view of the cap shown in FIG. 4A, in accordance with embodiments.
Figure 4D:
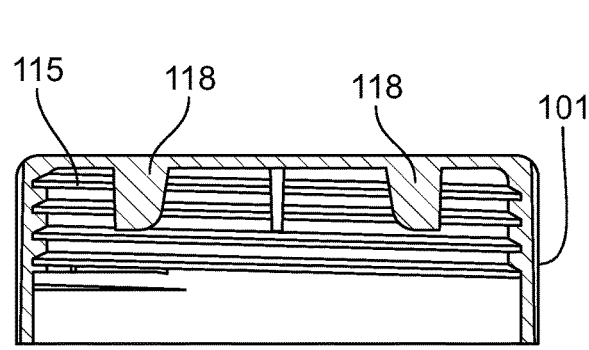
FIG. 4D is a cross-sectional view of the cap shown in FIG. 4A, in accordance with embodiments.

As shown in FIG. 1B, the opening 106 can include the piercing unit 104 for puncturing the pack 105 and releasing the substances inside the pack 105 into the container 102. In the illustrated embodiment, the piercing unit 104 is included in a chassis 114 configured to fit into the opening 106 and receive the pack 105. In embodiments, the chassis 114 can include at least one access hole (not shown) in a bottom of the chassis 114 to allow the contents of the pack 105 to escape into the container 102, once the pack 105 is punctured by the piercing unit 104. The bottom of the chassis 114 may comprise one large hole for providing access to inside the container 102 or a plurality of access holes that have either a uniform size or a number of different sizes. In some cases, the bottom of the chassis 114 may be at least slightly slanted downwards (e.g., towards a center of the chassis opening 106) in order to urge substances towards the access hole(s) and into the container 102. FIGS. 3A-3C show the chassis 114 and piercing unit 104 in more detail, in accordance with embodiments.

As shown in FIG. 1B, the top cap 101 (also referred to as "outer cap") is configured to be secured to the chassis 114 to seal the pesticide dispenser 100 and prevent spillage of the pest solution substance and/or liquid through the opening 106 during the mixing process (e.g., by shaking or turning the container 100 upside down). FIGS. 4A-4D show the top cap 101 in more detail, in accordance with embodiments.

In some embodiments, the piercing unit 104 and the chassis 114 form a stand-alone adapter that can be manufactured separately and attached to the opening 106 in order to make the container 102, or other generic container, compatible for use with the pack 105. In such cases, the adapter 114/104 may be an aftermarket product designed to retrofit existing containers into a dispensing unit that is compatible for use with the pack 105. For example, instead of purchasing a container specifically configured for use with the pack 105, a consumer can purchase the adapter and secure it to the threaded opening of any previously-owned container, such as generic container 202 shown in FIG. 5. In embodiments, the adapter may be sold in a number of different sizes so that the adapter can fit onto the openings of various containers.

For example, the container 102 may be a commercially-available liquid container (e.g., liquid detergent bottle, liquid pesticide container, etc.) that can be converted into, or re-purposed as, the pesticide dispenser 100 through addition of the adapter, or the chassis 114. In some embodiments, the pre-existing container 102 comes with the top cap 101, which has a threaded portion 115 that is configured to mate with a similarly threaded piece 116 coupled to the opening 106. In other embodiments, the top cap 101 forms part of the adapter.

Figure 1D:
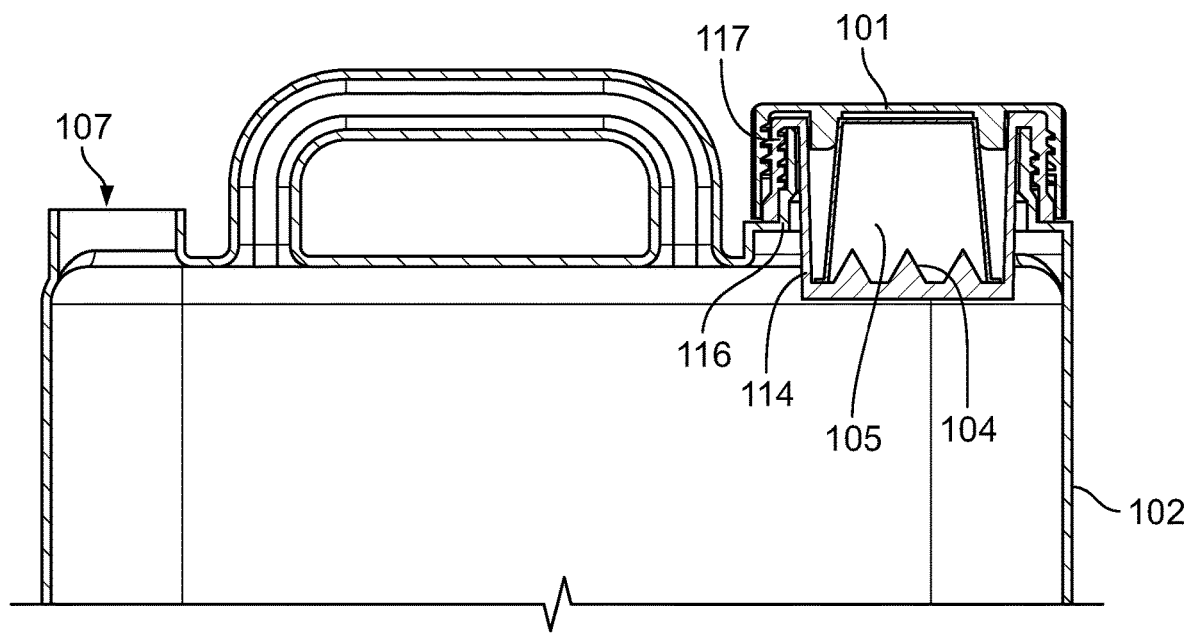
FIG. 1D is a cross-sectional partial view of the pesticide dispenser shown in FIG. 1C, in accordance with embodiments.

In either case, in order to fit the chassis adapter 114 into the opening 106 and between the top cap 101 and the threaded piece 116, the chassis 114 includes a double-threaded portion 117 that is configured to be coupled to both the top cap 101 and the threaded piece 116 of the opening 106, as shown in FIG. 1D. Specifically, the double-threaded portion 117 includes an outer threaded portion 117a configured to mate with the threaded portion 115 of the top cap 101 and an inner threaded portion 117b configured to mate with the threaded piece 116 of the opening 106. As a result, the chassis 114 can fit within or between the top cap 101 and the threaded piece 116 without changing an outer appearance of at least that portion of the container 102.

In other embodiments, in order to convert any given container into a dispensing unit that is compatible with, or capable of receiving, the pack 105, the chassis 414 and/or the top cap 101 may be manufactured in a plurality of different sizes and/or with different threading configurations to match the sizes and/or threading configurations of the openings of existing or commonly-available containers.

Figure 5:
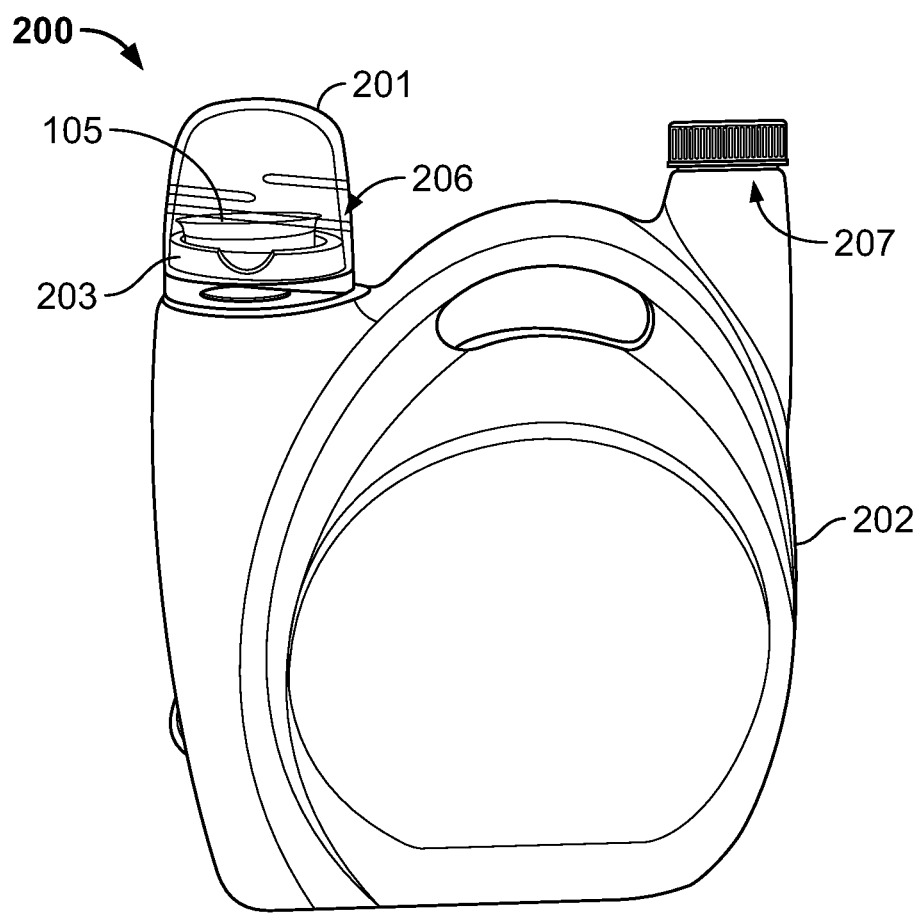
FIG. 5 is a front view of a second example embodiment of a pesticide dispenser.

For example, FIG. 5 shows an exemplary pesticide dispenser 200 comprising a simple top cap 201, a pre-existing, or commercially-available, container 202, and a pack adapter 203 inserted into an opening 206 of the container 202 in order to receive the pesticide pack 105. As shown, the adapter 203 can be configured to fit within the opening 206 and be covered by the top cap 201 for securing the pack 105 therein. The adapter 203 may comprise a chassis and piercing unit (not shown) similar, in operation and design, to the chassis 114 and piercing unit 104 shown in FIGS. 3A-3C, except without the outer thread 117a due to the lack of a threaded unit in the top cap 201. The container 202 can also includes a second opening 207 that can be adapted to receive a liquid or connect to a liquid dispensing unit.

Referring back to FIGS. 4A, 4B, and 4D, the top cap 101 can include a plurality of extensions or holders 118 configured to secure the bottom surface 112 of the pack 10 therebetween and against the top cap 101, in accordance with embodiments. The extensions 118 can be arranged on an underside of the top cap 101 according to a size and shape of the bottom surface 112, so that each extension 118 touches the bottom surface 112 when the pack 10 is placed into the chassis 114 and the top cap 101 is secured to the chassis 114. In some embodiments, the top cap 1001 includes one or more piercers (not shown) for piercing the bottom surface 112 of the pack 105. For example, the top cap 101 may include one or more spikes, needles, screws, or other sharp objects capable of creating one or more holes in the pack 105. In such cases, a passageway may be created through the pack 105, from top to bottom, for emptying the contents of the pack 105 through the opening 106 and into the container 102.

In embodiments, the piercing unit 104 can include one or more spikes, needles, screws, piercers, or other sharp objects capable of creating one or more holes or puncture points (not shown) in the pack 105 that are large enough to permit passage of the contents of the pack 105. In some cases, the one or more puncture points are configured to allow passage of dry contents. In other cases, the one or more puncture points are configured to allow passage of the pesticide contents after it has been diluted in water or other liquid. In such cases, for example, the water may enter the container 102 through the opening 106 and therefore, the contents of the pack 105 may already be diluted or liquefied when passing through the one or more puncture points towards the container 102.

Figure 6A:
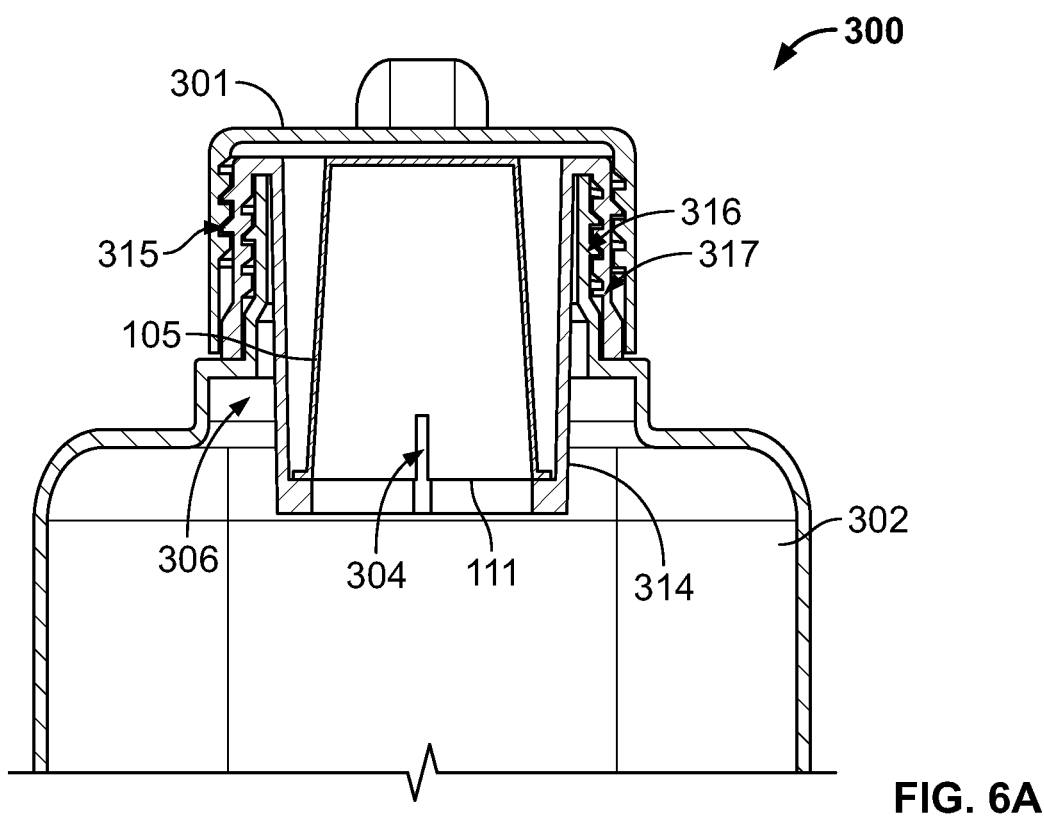
FIG. 6A is a cross-sectional partial side view of a third example embodiment of a pesticide dispenser.
Figure 6B:
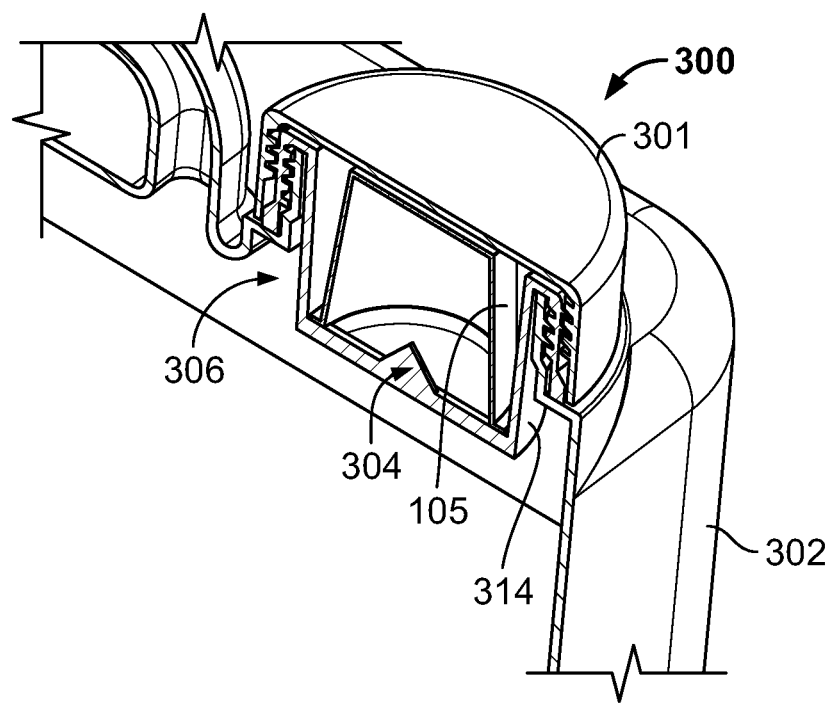
FIG. 6B is a cross-sectional partial perspective view of the pesticide dispenser shown in FIG. 6A, in accordance with embodiments.

The piercing unit 104 can include any number of piercers arranged in any suitable manner that allows the contents of the pack 105 to exit. For example, in the embodiment shown in FIG. 3C, the piercing unit 104 includes three sharp points or spikes positioned in a row across a middle of the chassis 114, so as to create a row of puncture points across the top end 111 of the pack 105. In other embodiments, the piercing unit 104 may include only one sharp point. For example, FIGS. 6A and 6B show another example pesticide dispenser 300 that has a top cap 301 similar to the top cap 101, a container body 302 similar to the container 102, and an opening 306 similar to the opening 106. The container 302 also includes a chassis 314 that has inner and outer threads 317 that are similar to double-threaded portion 117 for mating with a threaded portion 315 of the top cap 301 and a threaded piece 316 coupled to the opening 306. However, the chassis 314 includes a piercing unit 304 that comprises only one, centrally-located piercer or sharp point. As will be appreciated, any number of piercers or sharp points, or other combinations, may be utilized to form the piercing unit disclosed herein.

In some embodiments, for example, as shown in FIG. 1B, the pack 105 may be placed upside-down or inverted before being placed in the chassis 114 or the opening 106. In such cases, for example, as shown in FIG. 1D, the piercing unit 104 is configured to pierce the top surface 111 of the pack 105 using one or more piercers positioned adjacent to the bottom of the chassis 114, for example, as shown in FIG. 3C. In other embodiments, the piercing unit 104 is configured to pierce the bottom end or surface 112 of the pack 105. In such cases, the piercing unit 104 can include a bottom piercer that is positioned adjacent to the bottom of the opening 106 for puncturing the bottom end 112 of the pack 115. In still other embodiments, the piercing unit 104 is configured to pierce the pack 105 from both the top end 111 and the bottom end 112. In such cases, the piercing unit 104 includes both a bottom piercer and also a top piercer for puncturing the top end 111 of the pack 105. In such cases, a passageway may be created through the pack 105 for emptying the contents of the pack 105 through the opening 106 and into the container 102.

For example, FIGS. 7A and 7B illustrate an exemplary pesticide dispenser 400 comprising a container 402 that has a two-side piercing unit 404 within an opening 406 of the container 402. As shown, the piercing unit 404 includes a bottom piercer 419 and a top piercer 420. The bottom piercer 419 is positioned within a chassis 414 configured to receive or hold the pack 105 and fit into the opening 406. The top piercer 420 fits over the chassis 414, as shown in FIG. 7B. Once the pack 105 is positioning within the chassis 414, the bottom surface 112 of the pack 105 may be automatically punctured by the bottom piercer 419. One or more holes (not shown) may be included in the chassis 414 adjacent to, within, and/or below the bottom piercer 419 to permit drainage of the pesticide through the bottom piercer 419 and into the container 402, via the opening 406. To puncture both the top and bottom ends of the pack 105, the top piercer 420 may be pressed down over the pack 105, or otherwise secured to a top portion of the chassis 414, until the pack 105 is completely within the opening 106 and punctured by both the bottom piercer 419 and the top piercer 420.

The pesticide dispenser 400 can also include a second opening 407 for dispensing and receiving liquids. For example, a liquid dispensing unit 409 (e.g., a spray wand) can be coupled to a fastener 408 positioned at the second opening 407. The fastener 408 may include a threaded unit (not shown) configured for coupling with a similarly threaded piece of the liquid dispensing unit 409. The liquid dispensing unit 409 can include a hose 409a for carrying a liquid into and/or out of the container 402 (e.g., via the second opening 407) and a spraying device 409b for spraying or otherwise dispensing a liquid stored inside the container 402. In embodiments, the spraying device can be configured to have multiple sprayer settings for controlling the flow of liquid dispensed through the liquid dispensing unit.

In other embodiments, the piercing unit 104 is configured to pierce the pack 105 from only the top end 111. In such cases, the piercing unit 104 may include only the top piercer 120. As an example, FIGS. 8A-8D depict another exemplary pesticide dispenser 500 that includes a container 502 and a top piercing unit 504 coupled to an opening 506 of the container 502. The opening 506 is configured to receive the pack 105, as shown in FIG. 8C. The piercing unit 504 includes a top piercer 520 configured to pierce the top surface 111 of the pack 105. In the illustrated embodiment, the top piercer 520 is a sharp screw that is at least equal in length to the height of the pack 105, so that the screw top piercer 520 can puncture the bottom surface 112 of the pack 105, as well as the top surface 111. In this manner, the top piercer 520 can create a path through the pack 105 for emptying the pesticide contents into the container 502 through the opening 506.

As shown in FIG. 8B, the opening 504 can include a chassis 514 for receiving the pack 105, and can include a plurality of access holes or apertures 522 at the bottom of the chassis 514 to allow the contents of the pack 105 to pass therethrough into the container 102. In embodiments, the apertures 522 are configured to be large enough to pass at least the pesticide or other substance inside the pack 105. In the illustrated embodiment, the apertures 522 include a central aperture that is larger than a number of surrounding apertures.

As also shown in FIG. 8B, the opening 506 has a cylindrical shape that is specifically configured to receive or accommodate the cylindrical shape of the pack 105. Further, as shown in FIG. 8C, a height of the opening 506 is specifically configured according to the height of the pack 105, so that the top surface 111 of the pack 105 is at least partially visible after being placed into the opening 506.

As shown in FIG. 8D, the piercing unit 504 is shaped like a cylindrical cap with a diameter that is large enough to cover or fit over the top surface 111 of the pack 105. As shown in FIG. 8A, the top piercing unit 504 can also be configured to couple to or fit onto the opening 506 of the pesticide dispenser 500. In such cases, once the piercing unit 504 is coupled to the container 502, both the opening 506 and the pack 105 placed therein can be substantially hidden under the piercing unit 504, for example, as shown in FIG. 8A. In this manner, the piercing unit 504 can also serve as a cap or stopper to prevent spillage of pesticide and/or liquid through the opening 506.

In still other embodiments, the piercing unit 104 can be configured to pierce the sidewall of the pack 105 by being positioned on the sidewalls of the chassis 114, for example. In such cases, the pesticide contents of the pack 105 may exit through one or more puncture holes formed in the sidewall of the pack 105 and pass through the opening 106 to enter the container 102.

In some embodiments, the pesticide dispenser 100 includes a handle 124 that is fixedly attached to the container 102 for carrying the dispenser 100, for example, as shown in FIG. 1A. In other embodiments, the handle 124 may be removably attached. For example, in FIGS. 8A and 8B, the pesticide dispenser 500 includes a handle 524 that is removably secured to a second opening 507 of the container 502, to allow access to an interior of the container 502.

The second opening 507 may be larger than the opening 506 and may be configured for receiving a liquid, such as water, to dilute the concentrated substance emptied from the pack 105 into the container 502. In some cases, the second opening 507 may be configured for attachment to a liquid dispensing unit (such as, e.g., the liquid dispensing unit 409 shown in FIG. 7A) for filling the container 502 with the liquid. In other cases, the second opening 507 may be a simple hole for filling the container 502 with liquid poured from, for example, a faucet, a water hose, a bottle, or the like. In such cases, the container 502 may include a separate liquid dispensing unit (not shown) that is either fixedly or removably attached to the container 502, for example, similar to the liquid dispensing unit 409 shown in FIG. 7A.

In some cases, the opening 506 may be configured to include a fastener configured for attachment to a liquid dispensing unit. In such cases, once the pack 105 is pierced by the piercing unit 504, the piercing unit 504 may be removed, and a liquid dispensing unit may be coupled to the chassis 514 to dispense the liquid-pesticide mixture from the container 502.

In embodiments, the pesticide dispensers 100, 200, 300, 400, and/or 500 may be a portable system that includes an attachment mechanism (not shown) for removably attaching the container to the user. For example, the attachment mechanism may include one or more straps attached at both ends to the container. The one or more straps can be configured to be worn on or around the user's body to secure the container to the user. For example, the attachment mechanism may include two shoulder straps configured for strapping the container to onto the back of the user, for example, like a backpack. As another example, the attachment mechanism may include one shoulder strap configured for strapping the container across the body of the user, or for hanging the container from one shoulder of the user, for example, like a messenger bag.

In embodiments, the container 102 may be filled with a liquid (e.g., water) prior to receiving the pesticide from the pack 105 or attaching the chassis adapter 114 to the container 102. In some cases, the opening 106 may be used to pour the liquid into the container 102 prior to attaching the chassis adapter 114. Then, once the pack 105 is inserted into the chassis 114, the top cap 101 can be secured onto the top of the chassis 114 to seal the container 102. In embodiments, the pesticide inside the pack 105 may be a quick-dissolving substance that requires minimal or very little mixing. In some cases, the container 102 may be turned upside-down or shaken at least once to ensure that the pesticide and liquid are mixed together.

Embodiments of a selection tool for selecting an appropriate pesticide solution (e.g., pesticide pack 105) for use with the pesticide dispenser 100, or others disclosed herein, will now be described.

Figure 9:
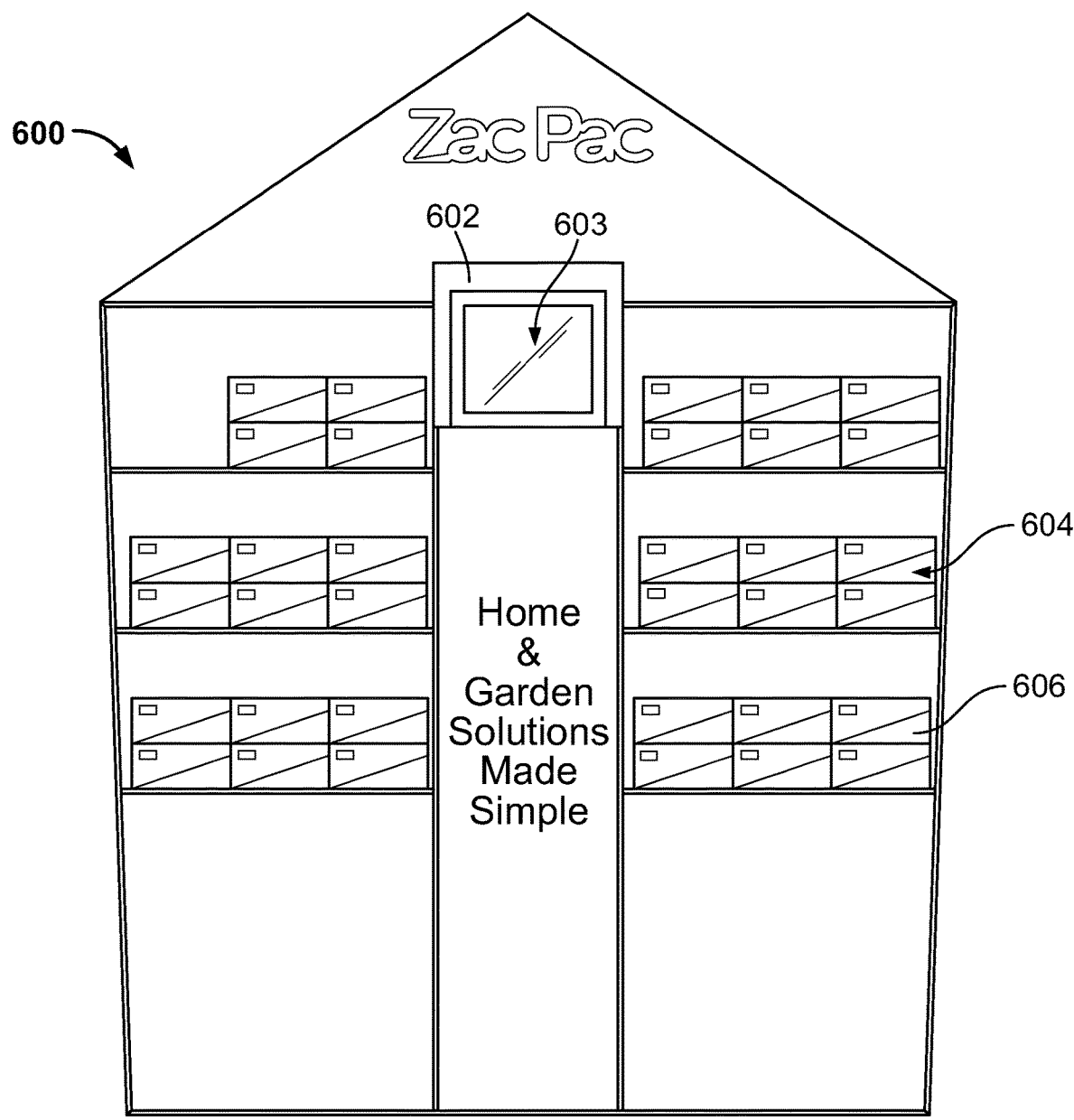
FIG. 9 illustrates an example pesticide selection kiosk, in accordance with embodiments.

FIG. 9 depicts an example selection kiosk 600 configured to guide a user (or customer) to a pest solution that is appropriate for handling a pest or other problem specified by the user, in accordance with embodiments. The selection kiosk 600 can be placed in retail stores or other points of purchase, and in some cases, can replace, remove the need for, or reduce the number of display shelves carrying pest solution products in the store. As used herein, the term "pest solution" can include pesticide products and/or non-chemical products or solutions designed to deter or minimize pests and other problems (such as, e.g., non-lethal mouse traps, natural repellants, etc.).

As illustrated, the selection kiosk 600 includes a display 602 configured to display a graphical user interface 603 for prompting the user to make selections related to, or describing, an indoor or outdoor problem to be solved and for presenting a recommended solution based on the user's selections, for example, as shown in FIGS. 13A-13G and discussed in more detail below. In embodiments, the display 602 can be a touchscreen display that is configured to detect touch inputs representing user selection of prompts presented by the graphical user interface 603 and/or other entry of information by the user. In the illustrated embodiment, the selection kiosk 600 also includes a plurality of display shelves 604 for displaying a number of different products 606, one or more accessories (not shown) for utilizing the products 606, and/or other inventory.

According to embodiments, the kiosk 600 processes the user selections received via the graphical user interface 603 in view of information stored in a memory (not shown) of the kiosk 600, or information obtained from a remote server (not shown), to generate a product recommendation that is tailored to the specific needs and geographical location of the user, as well as any other parameters associated therewith. For example, in some cases, the kiosk 600 may be configured to automatically determine a geographical location of the kiosk 600, for example, based on stored geographical parameters or using a global positioning receiver (not shown), and use the obtained geographical location to narrow down the list of possible pest-related problems and corresponding solutions. Further, the kiosk 600 can obtain information from a pest solutions database (not shown) that lists information about known pests or other problems, including the geographical region(s) in which a given problem can be found, the time(s) of year during which the problem can appear, the household area(s) or site(s) where the problem can be located, and the pesticide(s) and other product(s) that can be effective for eliminating, repelling or minimizing the problem. In some cases, the kiosk 600 can also obtain information from a pesticide restrictions database that stores information related to government regulations, seasonal restrictions, and other usage limitations pertaining to the sale and/or use of pesticide products. In some cases, the pesticide restrictions database can be limited to local restrictions that, for example, apply only to the geographic region in which the kiosk 600 is located, one or more neighboring regions, and/or any other nearby region(s) in which customers of the kiosk 600 are likely to reside. In other cases, the restrictions database can include nationwide information, such that the same database can be included in any kiosk 600 in any part of the country.

In an example use case, a user can interact with the graphical user interface 603 presented on the kiosk display 602 to answer various layers of questions about the user's indoor/outdoor problem. Based on the user's answers, the geographical information associated with the kiosk 600 and/or the user, and information obtained from at least one of the pest solutions database or the pesticide restrictions database (also referred to herein as "pest solution criteria"), the kiosk 600 can narrow down a fairly large list of possible problems and hone in on an ideal or appropriate pest solution for addressing the user-specified problem. The kiosk 600 can then present, on the display 602, a recommendation for a corresponding product 606. The user can locate the recommended product 606 on the kiosk shelves 604 and proceed to checkout at the store's cash registers.

In embodiments, each layer of questioning, or user prompts, can help the kiosk 600 further narrow the pool of possible problems or solutions. The number of layers can vary depending on, for example, the answers received, the complexity of the selected problem, and/or the number of possible solutions for addressing said problem. As an example, in some embodiments, a first layer of questioning may ask the user to identify the general area or site affected by the problem (e.g., lawn, hardscape, ornamental, garden, indoor, woods/brush, etc.), a second layer may ask the user to identify the type of pest or other problem to be solved in the selected area (e.g., dead spots, discoloring, weeds, insects, etc.), a third layer may ask the user to identify a specific feature or category associated with the selected type of problem, and a fourth layer may ask the user to identify a specific species of the selected feature or category (see, e.g., FIGS. 13A-13G).

In other embodiments, the inquiry may stop at the third layer of questioning because, for example, the problem selected by the user has only a few possible categories and no further species breakdown, or the same product 606 can be used to address all species of the selected category. In still other embodiments, the inquiry may go onto a fifth layer of questioning because, for example, the species selected by the user requires a further breakdown in order to identify an appropriate product 606.

Figure 13A:
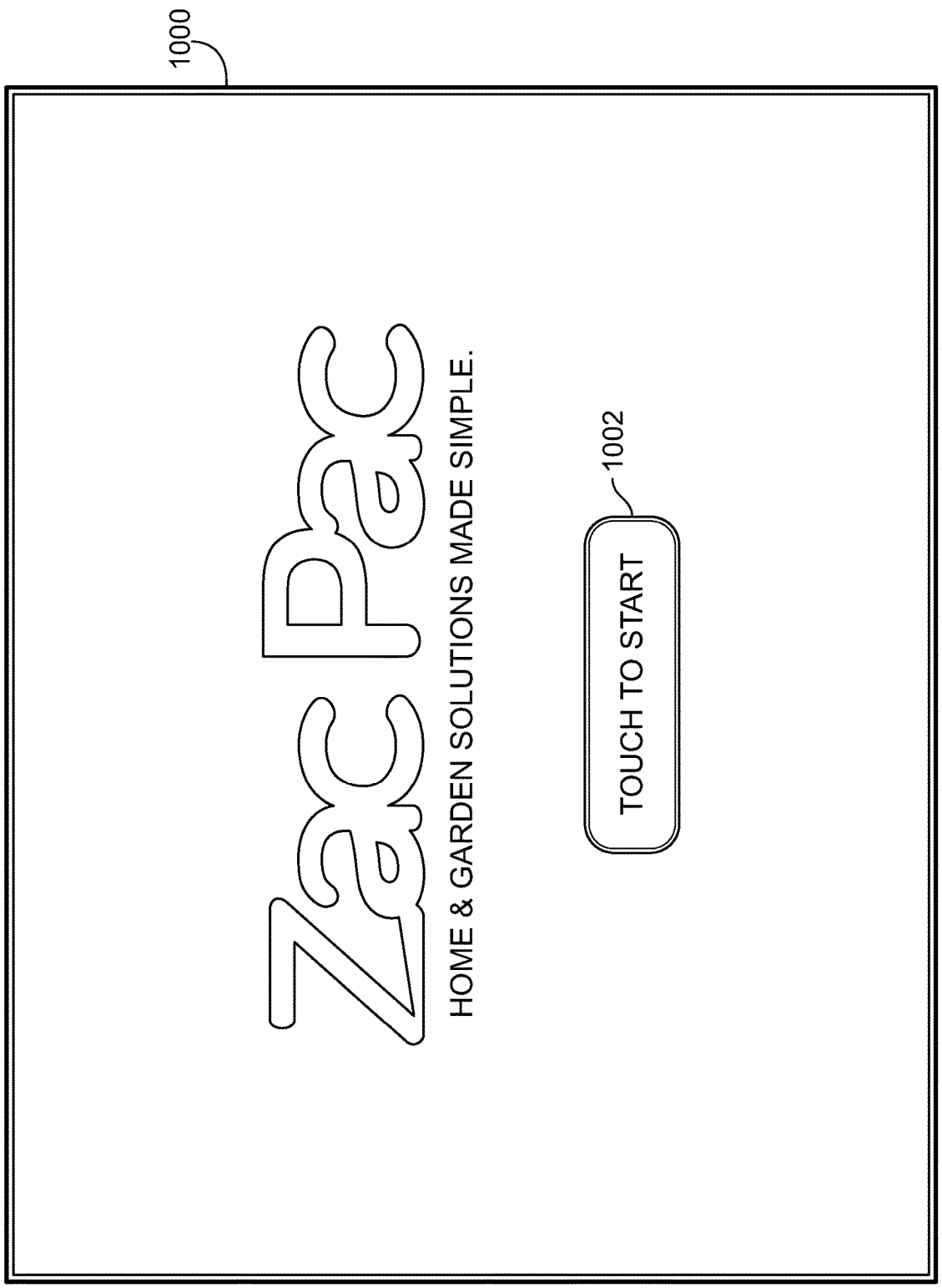
FIGS. 13A-13G are example screenshots for guiding a user to an appropriate pest solution in accordance with embodiments.

According to embodiments, the graphical user interface 603 can present a series of visual prompts with each layer of questioning to help trigger recognition of the exact problem(s) affecting the user and/or to help the user answer questions quickly and accurately. For example, the graphical user interface 603 may display each layer of questioning with a plurality of user-selectable answer choices and a plurality of corresponding images (e.g., drawings, icons, pictures, photographs, etc.) that are pre-selected to help the user more-readily recognize a respective answer choice. To be more effective in this regard, the visual prompts can include a photograph of a naturally-occurring (or "real world") instance of the problem (e.g., weed, insect, or other pest) that will trigger the user's recollection of his/her own problem. For example, one of the prompts may ask the user to select a category of weeds, and the user-selectable answer choices may include "broadleaf," along with a photograph of an actual broadleaf weed, and "grassy," along with a photograph of an actual grassy weed (e.g., as shown in FIG. 13D). As another example, once the user selects the problem of "lawn—dead spots" (also known as brown spots), the graphical user interface 603 may present a plurality of visual prompts including photographs of naturally-occurring lawns with different types of dead spots. Based on the type of dead spots, the kiosk 600 can determine the underlying cause (e.g., lawn disease, pest damage, pet damage, poor growing conditions, etc.). In embodiments, the answer choices may also include textual descriptions of each option to further assist the user in selecting a correct answer (e.g., as shown in FIG. 13D).

In embodiments, the prompts or answer choices presented by each selection kiosk 600 can be tailored according to one or more local factors, including, for example, a geographical location of the kiosk 600 and/or the user, local regulations affecting pesticide use, and/or a local availability of the products 606. In some cases, the relevant local factors are pre-determined parameters that are pre-selected based on a current geographical location of the kiosk 600, stored in a memory of the kiosk 600 (e.g., in the pesticide restrictions database), and utilized by the kiosk 600 to generate prompts appropriate for the current location. In some cases, the kiosk 600 includes a location-determining receiver (not shown), such as, e.g., a GPS receiver, for obtaining current geographical coordinates for the kiosk 600, and based on the received coordinates and information stored in, for example, the pesticide restrictions database, the kiosk 600 can determine which local factors to apply during a user session. In other cases, the kiosk 600 may prompt the user to enter a zip code or other geographical information and may determine which local factors to apply based on the entered information, in addition to, or instead of, the geographical location of the kiosk 600.

In some embodiments, the kiosk 600 may provide the user with an interactive map and/or satellite image corresponding to the location entered by the user and may prompt the user to select the property to be treated. In such cases, the kiosk 600 can communicate with a remote server (e.g., a GPS server) to obtain the satellite image and enable the selection process. For example, the kiosk 600 can provide or include a mapping service (such as, e.g., Google Earth™) and can prompt the user to pinpoint, on the map, an exact location of the property to be treated. In some cases, the user can utilize the mapping service to draw, outline, or otherwise define a specific problem area (e.g., a front yard, a rose garden, a backyard deck, etc.), via the graphical user interface 603. The kiosk 600 can automatically calculate a surface area of the defined location or property, rather than asking the user to provide or estimate this information. In this manner, the kiosk 600 can further remove guesswork from the pest solution selection process, particularly with respect to the quantity of pesticide required.

According to embodiments, the questions and/or answer choices presented by the graphical user interface 603 can be selected by the kiosk 600 based on the problems or pests that are actually found in the geographical region surrounding the kiosk 600 and/or in a geographical region entered by the user. For example, the answer choices presented for the type of weed affecting the user's lawn can vary depending on whether the kiosk 600 is located in New England or in Arizona. Further, if regulations in a given region ban the sale of one of the products 606, a kiosk 600 located in that region may be configured to recommend an alternative to the banned product. In some cases, the banned product may be removed from a list of products 606 stored in a memory of the kiosk 600 (e.g., an inventory list) to remove any chance of recommending this product. Similarly, if a given product 606 is not available for sale in a given region, the kiosk 600 may be configured to remove the unavailable product from its inventory list, notify the user of the product's unavailability, and/or suggest an alternative from the products 606. In such cases, the kiosk 600 may be configured to determine one or more alternatives, or secondary recommendations, for the recommended product 606, if possible. If none of the products 606 associated with the kiosk 600 are suitable for addressing the user-specified problem, the kiosk 600 may generate a list of recommended products sold by other manufacturers, retailers, or pesticide companies.

In some embodiments, the kiosk 600 may be configured to periodically or regularly update the information stored in its databases (e.g., an inventory database, the pest solutions database, and/or the pesticide restrictions database) via communication with a remote server. This allows the product recommendations to take into account, for example, the government regulations or seasonal restrictions that are currently in effect for a given area, recent revisions to any regulations or restrictions, the current status of pesticide product registrations, weather report information that may affect usage of the products, any new product offerings or new product information, any revisions to the existing product information (e.g., ingredients, usage instructions, effectiveness, side effects, etc.), the current availability of the products 606 in the given area, and/or any other changes pertaining to the products 606.

In embodiments, the product recommendation displayed upon completion of all questioning can provide, in addition to or instead of the product name, a number of descriptors that are associated with the recommended product 606 to help the user locate the exact item(s). For example, the product descriptors can include a specific color associated with the recommended product 606 to identify the type of pest solution, a unit size for said product 606, a number of units of the product 606, or any of a number of other descriptive terms.

More specifically, in some embodiments, a packaging of the products 606 can be color-coded by assigning a different color to each product type and/or category, in order to facilitate locating the correct product on the shelves 604 and/or to differentiate the various types of products 606. In some cases, variations of a given product type may be colored different shades of the same color. For example, all lawn products may be colored different shades of green (e.g., light green, lime green, hunter green, etc.), and all indoor products may be colored different shades of blue (e.g., sky blue, navy blue, dark blue, etc.). Accordingly, the product recommendation displayed on the display 602 may read, for example, "Use Green Solution" or "Use Red Solution Now and Purple Solution in Two Months."

Further, the product recommendation may include a unit size and/or a quantity of units to use, as mentioned above. In some embodiments, to eliminate the guesswork associated with measuring an appropriate quantity of the pest solution for a given area and a corresponding amount of water, each unit or pack included in a given product 606 can be configured to have a uniform shape and size that holds a preset amount of concentrated pest solution, for example, as shown in FIGS. 2A and 2B. In this way, the products 606 can be exchangeably used with the same accessories, such as, for example, one or more standardized containers for mixing the pest solution with a liquid and dispensing the mixture onto the problem area (see, e.g., FIGS. 1A and 5). In some cases, the preset amount of concentrated pest solution included in the products 606 is uniform across all units (e.g., 2.5 ounces), and an intensity or strength of the application can be varied by mixing the preset amount of concentrated pest solution with different volumes of liquid (e.g., 1 gallon, 2 liters, etc.) and/or by combining a number of product units with a given volume of liquid, as needed to address a given problem. In such cases, the product recommendation may read, for example, "Use One Unit of Green Solution in a Two Liter Container" or "Use Two Units of Blue Solution in a One Gallon Container." In other cases, the products 606 can include packs having varying amounts of concentrated pest solution depending on the quantity required for mixing with a preset volume of liquid and/or to produce a preset volume of pesticide-liquid mixture (such as, e.g., to fill a 1.5 gallon container). As will be appreciated, the pest solution particle's physical and/or chemical properties (e.g., size, shape, composition, stability, distribution, etc.) can affect how the pest solution mixes with other substances and the resulting amount of pesticide-liquid mixture. In such cases, the product recommendation may read, for example, "Use One Unit of Green Solution," and the amount of liquid to add may be pre-established by a designated container.

In other embodiments, the products 606 can include different sized units or packs (such as, e.g., small, medium, large, etc.), each size comprising a pre-measured amount of concentrated pest solution for covering a preset application area. For example, a large-sized unit of the product 606 may be configured to cover 2,500 sq ft, while a small-sized unit of the product 606 may be configured to cover 1,000 sq ft. In some cases, more than one unit of the product 606 may be required, for example, to cover larger areas or to tackle tougher problems. In such cases, different-sized units may be combined to achieve the required amount of coverage. For example, the product recommendation displayed on the display 602 may suggest using one small-sized unit and one large-sized unit of a given product 606 for a first project (such as, e.g., 3,500 sq ft) and two large-sized units of another product 606 for a second project (such as, e.g., 5,000 sq ft).

Figure 10:
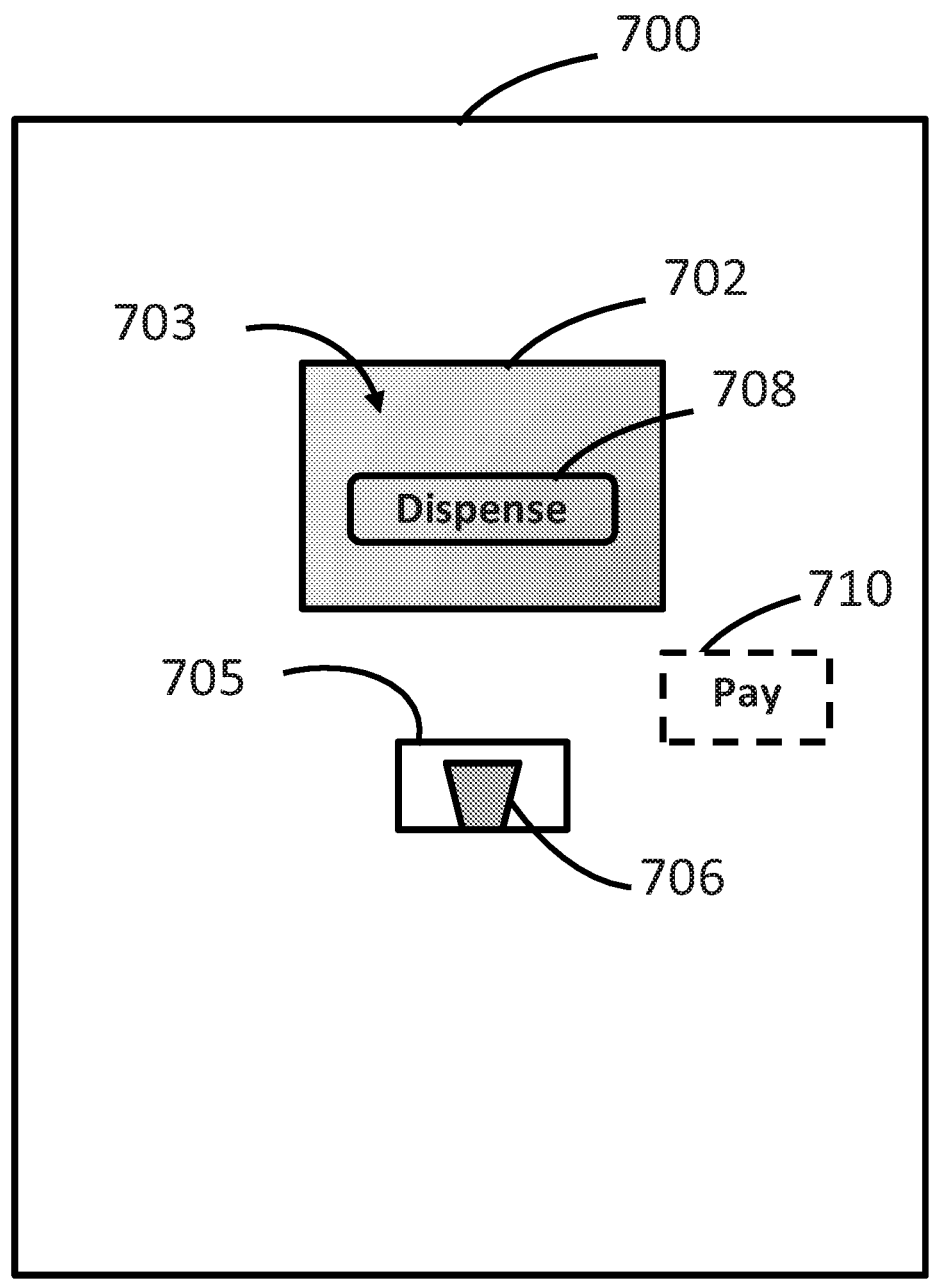
FIG. 10 illustrates an example pesticide dispensing kiosk, in accordance with embodiments.

FIG. 10 illustrates an example dispensing kiosk 700 (also referred to therein as a "dispensing machine") configured to identify an appropriate pest solution for addressing a user-specified problem and to dispense the selected pest solution from the kiosk 700, in accordance with embodiments. Like the selection kiosk 600, the dispensing kiosk 700 can be placed in retail stores or other points of purchase, and in some cases, can replace, remove the need for, or reduce the number of display shelves carrying pest solutions at the store.

As illustrated, the dispensing kiosk 700 includes a display 702 configured to display a graphical user interface 703 for guiding a user to a pest solution or product designed to eliminate, repel, or minimize the user-specified problem, similar to the display 602 and the graphical user interface 603 described above, and an opening 705 configured to dispense a selected product 706. The display 702 can be a touchscreen display that is configured to detect touch inputs representing user selection of prompts presented by the graphical user interface 703 and/or other information entry. In embodiments, the dispensing kiosk 700 stores a plurality of products 706 within a housing of the kiosk 700 and is configured to dispense a selected product 706 in response to user selection of a dispense option 708 presented in the graphical user interface 703. As will be appreciated, the dispensing kiosk 700 may include any one of a plurality of automatic dispensing mechanisms (not shown) to carry the selected product 706 from a storage position (not shown) within the kiosk 700 to the opening 705, or otherwise release the product 706 into the opening 705.

In embodiments, the graphical user interface 703 presented by the dispensing kiosk 700 may be substantially similar to the graphical user interface 603 of the selection kiosk 600, expect for the features related to dispensing the selected product 706 from the kiosk 700. For example, the user can interact with graphical user interface 703 presented on the kiosk display 702 to answer questions about the user's indoor/outdoor problem. Based on the user's answers, the dispensing kiosk 700 can identify an ideal or appropriate pest solution and present, via the graphical user interface 703, a recommendation for a corresponding product 706. However, the kiosk 700 can further present, via the graphical user interface 703, the option 708 to dispense the recommended product 706. Upon selection of the dispense option 708, the kiosk 700 dispenses a recommended quantity of the recommended product 706 into the opening 705. The user can then retrieve the product 706 from the opening 705 and proceed to checkout at the store's cash registers. In some embodiments, the kiosk 700 can dispense a pest solution substance directly into a user-supplied container (e.g., container 500 shown in FIG. 8A) that has been placed into the opening 705, instead of dispensing the product 706 with the substance inside of it. In such cases, the pest solution substance may be dispensed in a diluted or concentrated form, and the quantity of substance dispensed from the kiosk 700 can be determined based on a size of the treatment area.

In some embodiments, the dispensing kiosk 700 further includes a payment device 710 configured to collect payment for the dispensed product 706 from the user. The user may interact with the graphical user interface 703 and/or the payment device 710 in order to present payment information, cash, a payment device (e.g., a credit card, a debit card, a gift card, a mobile wallet, etc.), and/or any other information required to complete the transaction. In embodiments, the payment device 710 may include a display, a keypad, a card-swiping or card-reading unit, a wireless communication receiver, a radio for enabling mobile payment (e.g., via Google Wallet, Apple Pay, a near field communication device, or the like), and/or any other device that may be utilized for completing a payment.

Figure 11:
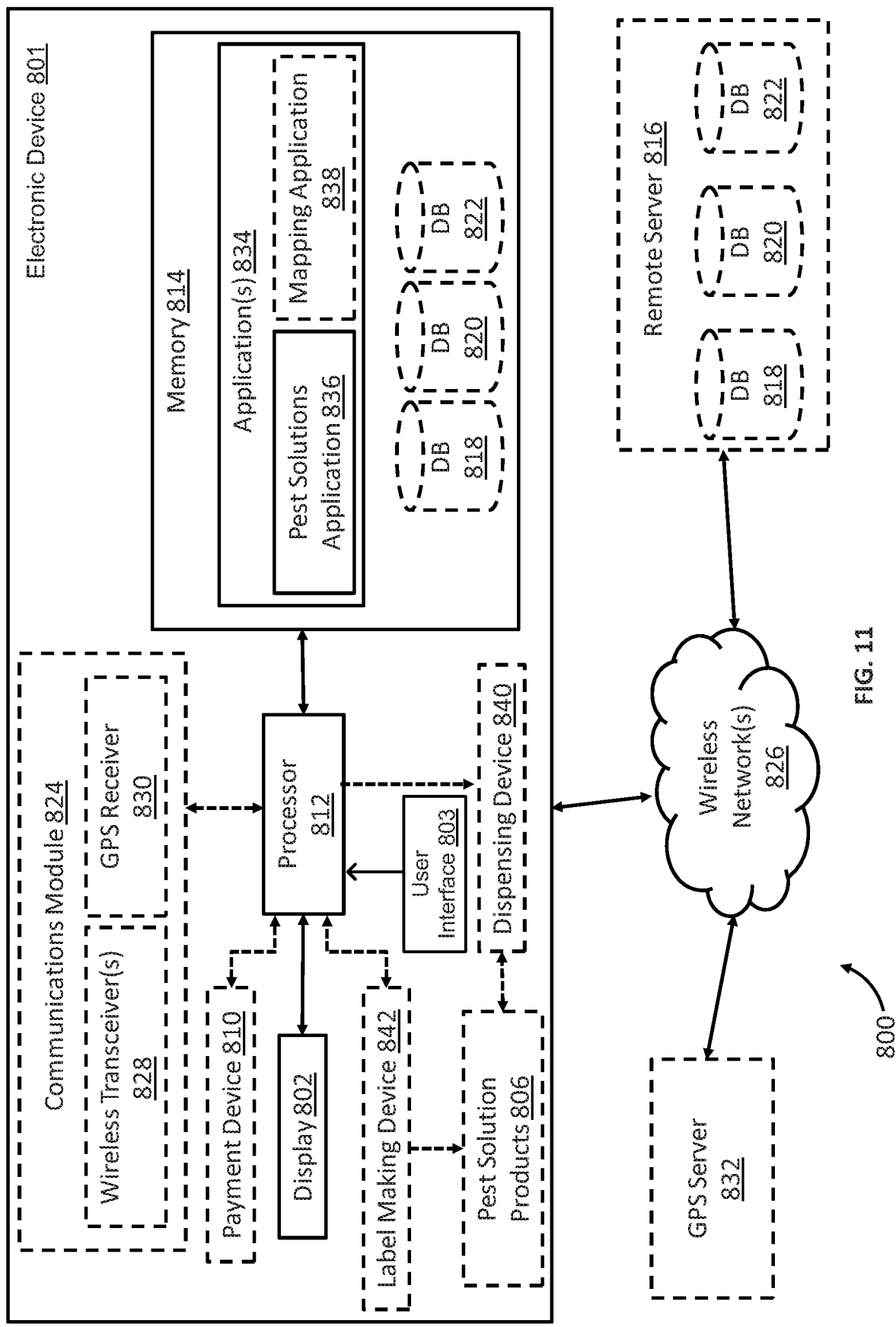
FIG. 11 a block diagram of an example pesticide solutions system in accordance with embodiments.

FIG. 11 illustrates an example pest solutions system 800 comprising an electronic device 801, such as, for example, a kiosk, configured to guide a user to an appropriate pest solution for a problem specified by the user, in accordance with embodiments. In some embodiments, the electronic device 801 is substantially similar to the selection kiosk 600 shown in FIG. 9 and therefore, is configured to recommend one of the plurality of products 606 stored on the display shelves 604. In other embodiments, the electronic device 801 is substantially similar to the dispensing kiosk 700 shown in FIG. 10 and therefore, is configured to recommend one of the plurality of products 706 stored within the kiosk 700 and dispense a user-selected product 706 through the opening 705 of the kiosk 700. In other embodiments, the electronic device 801 is a personal computing device, such as, for example, a mobile device (e.g., smartphone), a tablet, a laptop, or a desktop computer. As will be appreciated, other combinations of components and/or functionality are contemplated in view of the principles and teachings described herein.

As shown in FIG. 11, the electronic device 801 can include a display 802, a processor 812, and a memory 814. In some embodiments, for example, where the device 801 is a kiosk, the display 802 can be substantially similar to the display 602 and/or the display 702. In embodiments, the display 802 can include a touchscreen that includes contact-sensing technology configured to sense or detect user contact on the touchscreen display 802 and to send one or more signals indicating detection of a contact-based input to the processor 812. In some embodiments, the electronic device 801 can also include a user interface 803 comprising one or more input devices for receiving user inputs (e.g., keyboard, mouse, touchpad, etc.). In embodiments where the display 802 is a touchscreen, the user interface 803 may form part of, or be included in the display 802, or vice versa.

The processor 812 communicates with the memory 814, such as a electronic random access memory (RAM), or other forms of transitory or non-transitory computer readable storage mediums, operating under control of or in conjunction with an operating system (not shown). The operating system can be any commercial, open-source, or proprietary operating system or platform. In embodiments, the processor 812 can communicate with one or more databases, which may include, for example, an inventory database 818, a pest solutions database 820, and/or a pesticide restrictions database 822. The one or more databases can be stored, in whole or in part, on at least one of a local memory device, such as, the memory 814, or a remote device, such as, a remote server 816. While FIG. 11 shows the databases 818, 820, and 822 as independent or stand-alone entities, it is contemplated that one or more of said databases may be combined together, in whole or in part, partitioned into two or more parts, and/or included in a distributed database.

According to embodiments, the inventory database 818 can be configured to store inventory information, including, for example, a list of the products offered by the electronic device 801 (e.g., when implemented as the kiosk 700), or otherwise associated with the device 801 (e.g., when implemented as the kiosk 600 or a personal computing device), an availability of each product at the geographic location (e.g., store or current location of the user) associated with the electronic device 801 or from the device 801 (e.g., in the case of kiosk 700), a quantity of each product that is available at, nearby, or from the device 801, the applicable product descriptors for each product, as described herein, and/or an image of each product and/or its packaging.

The pesticide restrictions database 822 can include information about government regulations affecting the distribution and/or usage of pesticide products (e.g., a list of the pesticides that are subject to such regulations and the parameters of each regulation, including the zip codes, cities, counties, states, or other geographical locations to which each regulation applies) and seasonal or temporal restrictions on the distribution and/or usage of pesticide products (e.g., a list of the pesticides that are subject to such restrictions and the parameters of each restriction, including the dates, seasons, or times of the year during which usage/distribution is limited or prohibited).

Also in embodiments, the pest solutions database 820 can be configured to store pest solutions information, including, for example, pesticide usage information (e.g., how, when, and where to use each pesticide product, what pests to use the product for, how much to use, a size of the application area, etc.), ingredient information, pesticide usage prohibitions, information about possible pests and/or problems (e.g., where each pest/problem may be located, what may be causing the pest/problem, which pest solutions are effective for each pest/problem, the categories or species associated with each pest/problem, etc.), and/or a list of recommended and alternative pest solutions for each possible pest/problem. Further, the pest solutions database 820 can store a plurality of images (e.g., photographs, pictures, icons, graphics, etc.) depicting each of the pest solution products, the possible pests/problems, the possible locations for the pests/problems, the categories or species for the pests/problems, the causes of the pests/problems, and/or other features associated with identifying appropriate pest solutions in accordance with the principles described herein.

In some embodiments, the processor 812 can further communicate with a communication module 824, such as a wired or wireless data connection, which in turn communicates with one or more wireless networks 826, such as, for example, a wide area network, a GPS network, a wireless local network, a personal area network, or various other networks. The communication module 824 can comprise one or more wireless or radio transceivers 828 for communicating with the various wireless networks 826. For example, in embodiments, the one or more wireless transceivers 828 may comprise at least one of a WWAN transceiver capable of communicating with a wide area network, a WLAN transceiver capable of communicating with a local area network, or a WPAN transceiver capable of communicating with a personal area network (such as a Bluetooth® network). As shown in FIG. 11, the communication module 824 can further include a GPS receiver 830, or other location-determining receiver, for communicating with a GPS server 832 via the GPS network.

The electronic device 801 can use the components of the communication module 824 to connect to the other components of the pest solutions system 800. For example, the device or kiosk 801 can receive software updates, database updates, and/or other information from the remote server 816 via the wireless transceiver 828, and can receive GPS information associated with the kiosk 801 and/or the user from the GPS server 832 via the GPS receiver 830. As another example, the device or kiosk 801 may communicate with one or more of the wireless network(s) 826 (such as, e.g., the GPS network and a wide area network) to provide the mapping service that allows the user to pinpoint or identify an exact location the property to be treated, as described herein. As another example, the electronic device 801 can use the components of the communication module 824 to communicate sales and/or inventory information back to the remote server 816, which can share the received information with a warehouse so that inventory levels at the store or in the kiosk are maintained according to demand.

In embodiments, the processor 812 communicates with a set of applications 834 that can be configured to execute control logic and perform data processing to perform the functions and techniques discussed herein. For example, the set of applications 834 can comprise a pest solutions application 836 that can generate, and/or provide for display, the graphical user interfaces described herein, receive inputs from the user (e.g., via the graphical user interfaces), and facilitate the communication of data among the components of the system 800. In some cases, the set of applications 834 can comprise a mapping application 838 that can provide the mapping service described herein. In some cases, the mapping application 838 can be incorporated into or included in the pest solutions application 836 for more compact or efficient computer processing. It should be appreciated that other applications 834 and functionalities thereof are envisioned as well. In embodiments where the electronic device 801 is a mobile device, the set of applications 834 can be integrated into, or operate in conjunction with, a mobile application or other software designed for operating on the mobile device.

While FIG. 11 illustrates the electronic device 801 as a standalone system using a combination of hardware and software, the components of the device 801 can also be implemented as a software application or program capable of being executed by a conventional computer platform. Likewise, the components of the device 801 can also be implemented as a software module or program module capable of being incorporated in other software applications and programs. In either case, the components of the device 801 can be implemented in any type of conventional proprietary or open-source computer language.

In some embodiments, the electronic device 801 is like the dispensing kiosk 700 and includes a plurality of pest solution products 806 (including, for example, pesticide packs) and a dispensing device 840 (also referred to herein as "product dispenser"). The pest solution products 806 may be similar to the products 606 shown in FIG. 9 and/or the product 706 shown in FIG. 10. In embodiments, the products 806 can be stored in one or more storage positions (not shown) inside the kiosk 801. The dispensing device 840 can be configured to retrieve a selected one of the products 806 from its storage position and dispense the retrieved product 806 through an opening of the kiosk 801 (such as, e.g., the opening 705 of the kiosk 700). In some cases, the dispensing device 840 is in communication with the processor 812 and is configured to retrieve and dispense the selected product 806 in response to user selection of a dispense option presented in a graphical user interface (such as, e.g., the dispense option 708 in FIG. 2). For example, upon receiving said user selection, the processor 812 may provide the dispensing device 840 with an identification of the selected product 806 and an instruction to dispense said product 806. As will be appreciated, the dispensing device 840 can include any one of a plurality of automatic dispensing mechanisms (not shown) for carrying the selected product 806 from its storage position within the kiosk 801 to the opening of the kiosk 801, or otherwise releasing the product 806 into said opening.

In some embodiments, the kiosk 801 further includes a label making device 842 that is configured to generate customized labels for the pest solution products 806 and apply the generated labels to the products 806 prior to dispensing. The label making device 842 can be in communication with the processor 812 to receive label information from the processor 812 and/or the memory 814. The label information can include seasonal restrictions and/or government regulations associated with or relevant to a given pesticide product 806, as well as usage instructions, ingredient lists, coverage information, and/or other information related to the selected product 806. In some cases, the labels are generated just prior to dispensing a selected product 806, so that the label information is not only customized for the given pest solution product 806, but also, is as up-to-date as possible.

In some embodiments, the kiosk 801 further includes a payment device 810, similar to the payment device 710 shown in FIG. 10 and discussed herein. In some cases, the payment device 810 may request valid payment from the user before dispensing the selected product 806 from the kiosk 801.

Figure 12:
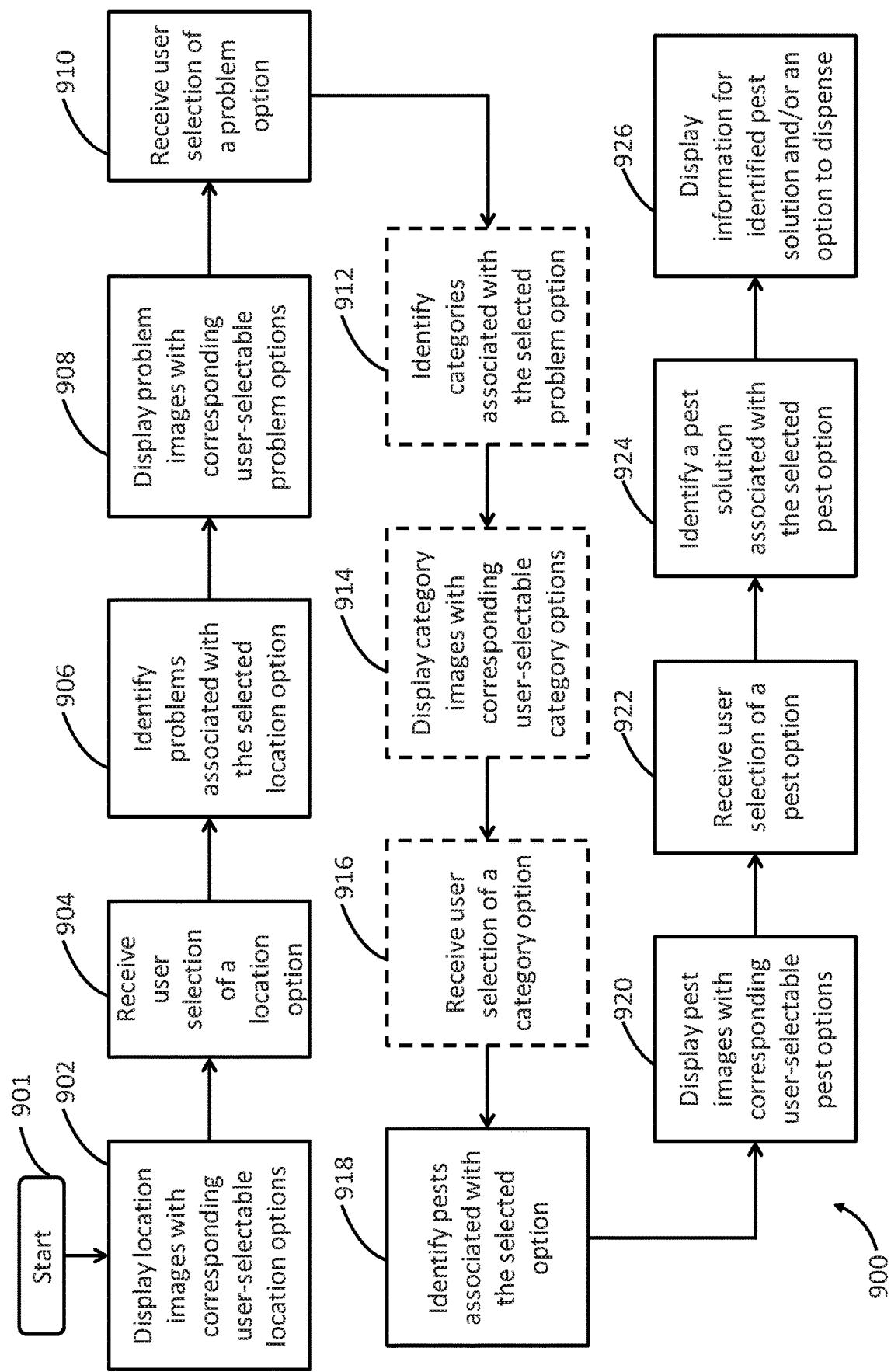
FIG. 12 is a flow diagram of an example method for guiding a user to an appropriate pest solution, in accordance with embodiments.

FIG. 12 is a flowchart of a method 900 for guiding a user to an appropriate pest solution using an electronic device, such as, e.g., the electronic device 801, the kiosk 600, or the kiosk 700. It should be appreciated that the functionalities of the method 900 can be implemented with the electronic device executing, on a processor (such as the processor 812), an application stored in a memory (such as the memory 814), and, in some cases, interfacing with a remote server (such as the remote server 816 and/or the GPS server 832). In embodiments, the application may be the pest solutions application 836, or a portion thereof, and/or the mapping application 838, or a portion thereof. In some embodiments, the application may be a computer program stored on a non-transitory computer readable medium that is executable by a processor of the device. Further, according to embodiments, the electronic device includes a display (such as, e.g., the display 602, 702, or 802) having one or more graphical user interfaces (such as, e.g., the graphical user interfaces 603, 703, or those shown in FIGS. 13A-13G) displayed thereon, the memory, and the processor communicatively coupled to the display and the memory for generating the graphical user interfaces.

FIGS. 13A-13G illustrate screenshots of exemplary graphical user interfaces that may be associated with the method 900, in accordance with embodiments. In particular, the illustrated graphical user interfaces can be associated with the execution, facilitation, and implementation of one or more aspects of the pest solutions application, which is designed to help a user accurately identify a problem to be treated and to guide the user to a pest solution that is appropriate for the identified problem. For example, the graphical user interfaces may be displayed on the display (such as, e.g., the display 802) of the electronic device (such as, e.g., the kiosk 801) that is configured to execute the pest solutions application. In embodiments, users can interface with the pest solutions application via a user interface of the electronic device (e.g., a touchscreen, a keyboard, a mouse, etc.), and the graphical user interfaces can be configured to enable users to provide input associated with various functionalities associated with the pest solutions application. For example, the graphical user interfaces can be displayed on the touchscreen display 802, which includes contact-sensing technology configured to sense or detect user contact on the touchscreen display 802 and send one or more signals indicating detection of a contact-based input to a processor (e.g., the processor 812) executing the pest solutions application. In some embodiments, the data associated with the graphical user interfaces, including data required to generate the graphical user interfaces, can be retrieved from one or more databases, such as, e.g., the inventory database 818, the pest solutions database 820, and/or the pesticide restrictions database 822. Alternatively, or additionally, said data can be received from and/or synchronized with a server (such as, e.g., the remote server 816).

The method 900 will be described herein with reference to the graphical user interfaces shown in FIGS. 13A-13G. It should be appreciated that the graphical user interfaces of FIGS. 13A-13G are merely exemplary and can comprise other various details, arrangements, and/or selectable options.

In embodiments, the method 900 can begin at step 901, for example, with initiation of the pest solutions application. As an example, FIG. 13A depicts a screenshot of an exemplary start interface 1000 associated with initiating the pest solutions application. The start interface 1000 can appear prior to receiving any input from a user and can re-appear once a user session has been completed. Upon receiving a signal indicating user selection of a start option 1002 displayed on the start interface 1000, the method 900 may continue to step 902.

Figure 15A:
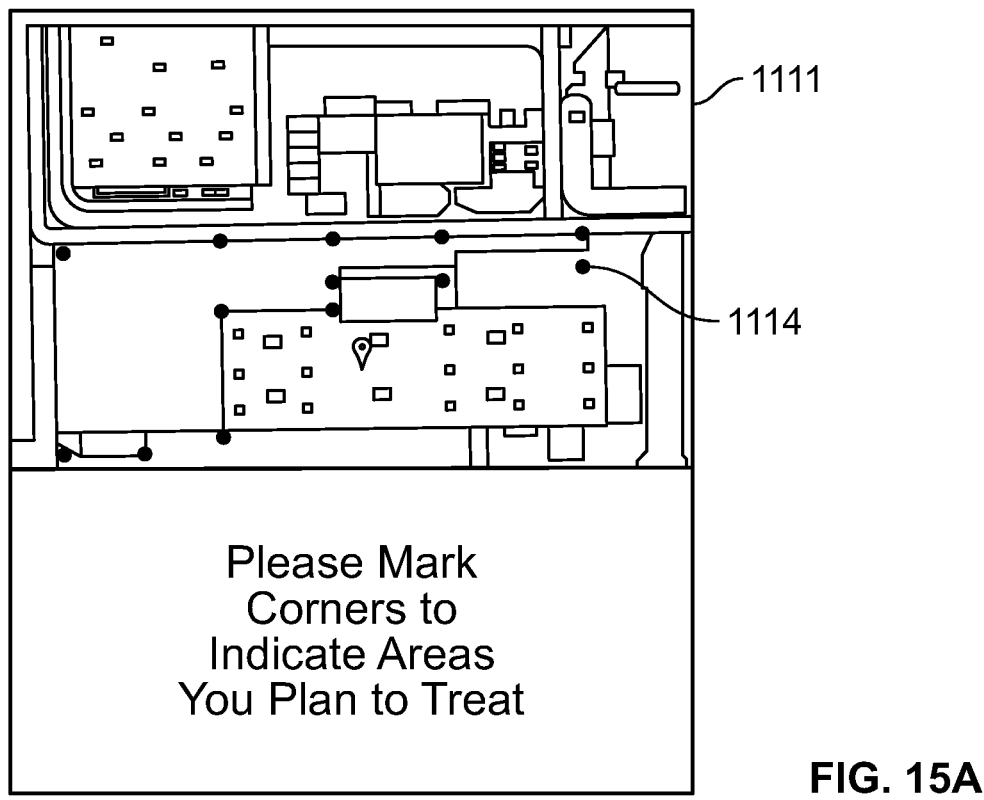
FIGS. 15A and 15B depict example screenshots for graphically selecting a pest treatment area, in accordance with embodiments.
Figure 15B:
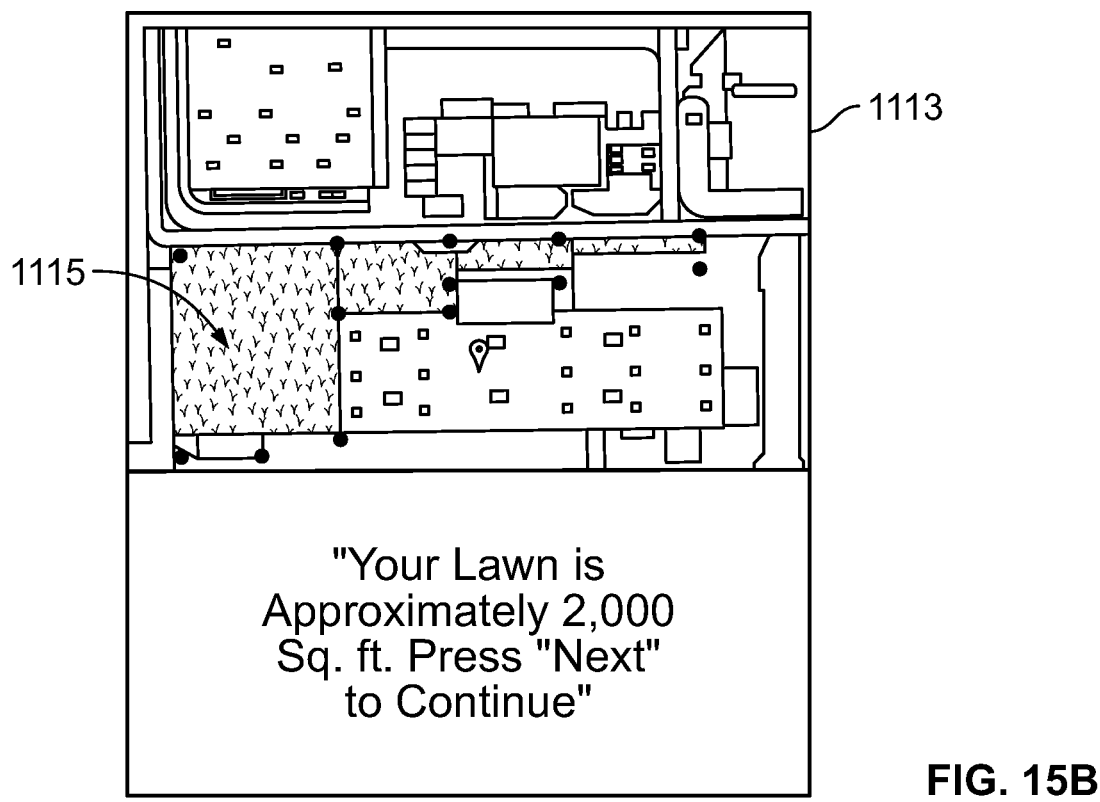

In other embodiments, the method 900 may further include requesting geographical location information from the user (not shown) before proceeding to step 902. In such cases, a geographical location interface (not shown) may be displayed upon receiving user selection of the start option 1002 in the start interface 1000. The location interface may prompt the user to enter geographical information associated with the user, the property to be treated, the point of purchase, and/or the electronic device. In some embodiments, the processor can be configured to execute a mapping application (e.g., the mapping application 834), and users can interface with the mapping application through the location interface. In embodiments, the geographical location interface can be configured to display an interactive map and/or satellite image and to enable users to zoom in/out, select, and search the interactive map, via the touchscreen display, in order to locate the user's current location and/or a property to be treated, for example, as shown in FIG. 15A. In some embodiments, the location interface can be configured to enable the user to draw an outline of the property to be treated, and the processor can be configured to estimate a square-footage of the outlined property, for example, as shown in FIG. 15B. Based on the exact location and property size, the processor can provide a more precise product recommendation and usage instructions.

Further, the processor can utilize the user-provided geographical information to analyze and/or identify various location-specific aspects of the pest solutions application, including, for example, government regulations and other geographical restrictions on the use of certain pesticides and/or an availability of the pest solution products offered in association with the pest solutions application and/or the electronic device. In some embodiments, the processor may automatically retrieve geographical information related to at least one of the electronic device, the point of purchase, or the user's current location by communicating with a global positioning system server (e.g., the GPS server 832). In other embodiments, geographical information about a current location of the electronic device may be pre-stored in the memory, and the processor may access this pre-stored information when analyzing the location-specific aspects of the pest solutions application.

At step 902, the processor generates a graphical user interface comprising a plurality of treatment area images (also referred to herein as "location images") presented in correspondence with a plurality of user-selectable location options, and provides said graphical user interface to the display for display thereon. Each location image can represent a possible area for applying pesticide or other pest solution and can include a drawing, photograph, icon, and/or any other representation of the location that will help the user readily recognize and identify the area to be treated. Each location image can be displayed adjacent to, or in conjunction with, a corresponding user-selectable location option, so that the user can easily make a selection once he identifies the correct location. In some embodiments, the processor retrieves the plurality of location images from the pest solutions database 820.

Figure 13B:
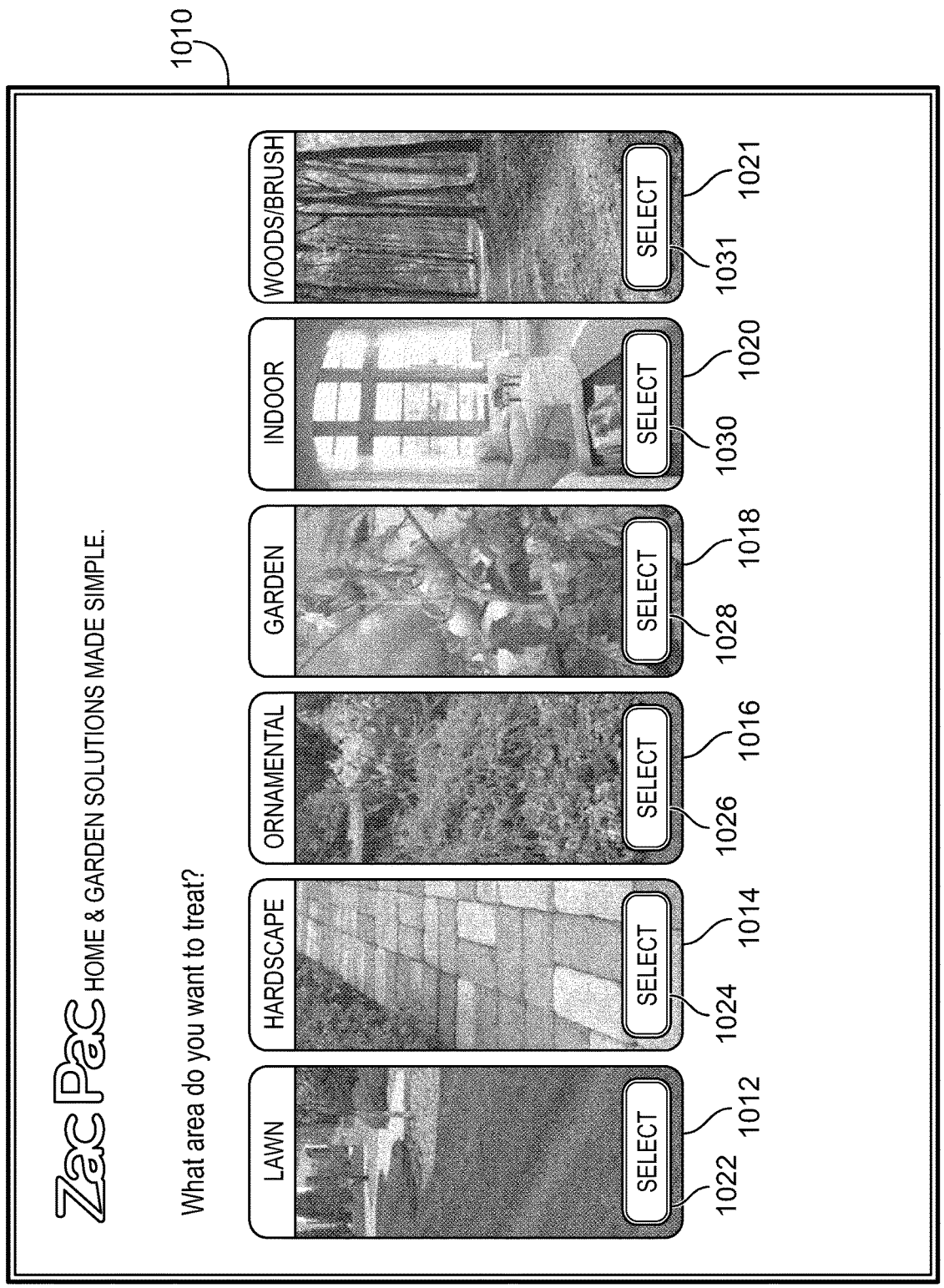

As an example, FIG. 13B depicts a screenshot of an exemplary treatment area interface 1010 associated with prompting the user to select an area or location to be treated using the pest solutions application. As illustrated, possible treatment locations or problem areas can include, for example, lawn (represented by a lawn image 1012), hardscape or patio areas (represented by a hardscape image 1014), ornamental areas, including flowering plants, (represented by an ornamental image 1016), garden areas, including vegetable gardens, (represented by a garden image 1018), indoor or household areas (represented by an indoor image 1020), and outdoor woods or brush area (represented by a woods/brush image 1021). As will be appreciated, images and/or locations other than those illustrated in FIG. 13B are also contemplated in accordance with the principles and teachings described herein. FIG. 13B also illustrates a plurality of user-selectable location options 1022, 1024, 1026, 1028, 1030, and 1031 that are displayed with, or overlapping, the location images 1012, 1014, 1016, 1018, 1020, and 1021 respectively. As shown, each of the possible treatment areas may also be labeled with textual descriptions.

At step 904, the processor receives, from the touchscreen display, a touch selection of one of the plurality of user-selectable location options 1022-1031 presented by the treatment area interface 1010. At step 906, based on said touch selection, the processor determines the location or treatment area associated with the selected location option and identifies one or more problems associated with the determined location. The processor may retrieve information from the one or more databases (such as, e.g., the pest solutions database 820) in order to identify which problems are associated with the user-selected treatment area. In some cases, the processor can be configured to select only those problems that are known to be found in, or associated with, a geographic location of the user and/or the electronic device.

At step 908, for each identified problem, the processor retrieves a problem image representing the said problem, generates a graphical user interface comprising the retrieved problem images presented in correspondence with a plurality of user-selectable problem options, and provides said interface to the display for display thereon. In embodiments, the problem images can include a photograph, a drawing, an icon, or any other representation of the respective problem that will help the user readily recognize and identify the problem to be solved. Each problem image can be displayed adjacent to, or in conjunction with, a corresponding user-selectable problem option, so that the user can easily make a selection once he identifies the correct problem. In some embodiments, the processor retrieves the plurality of problem images from the pest solutions database 820.

Figure 13C:
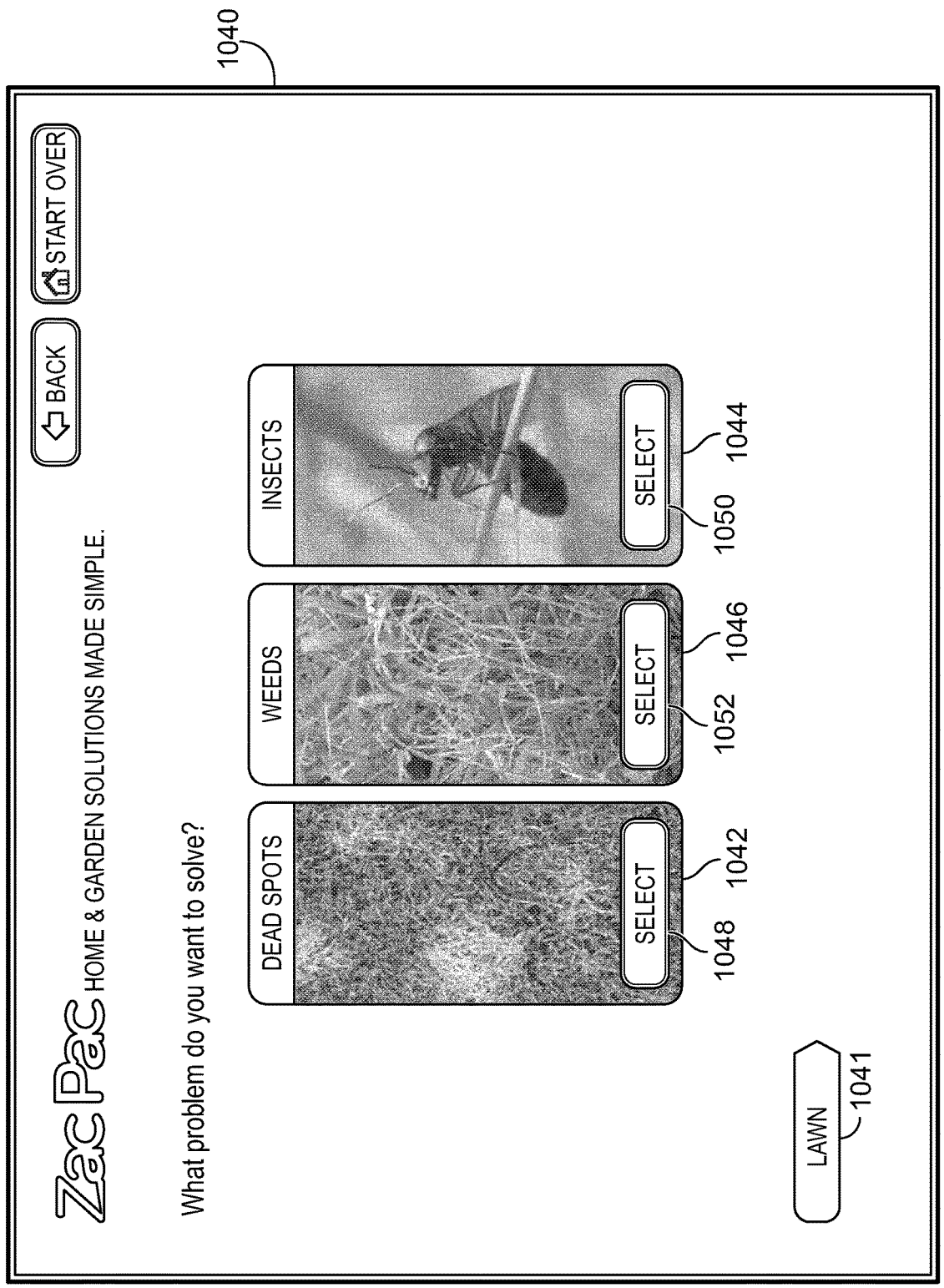
Figure 13D:
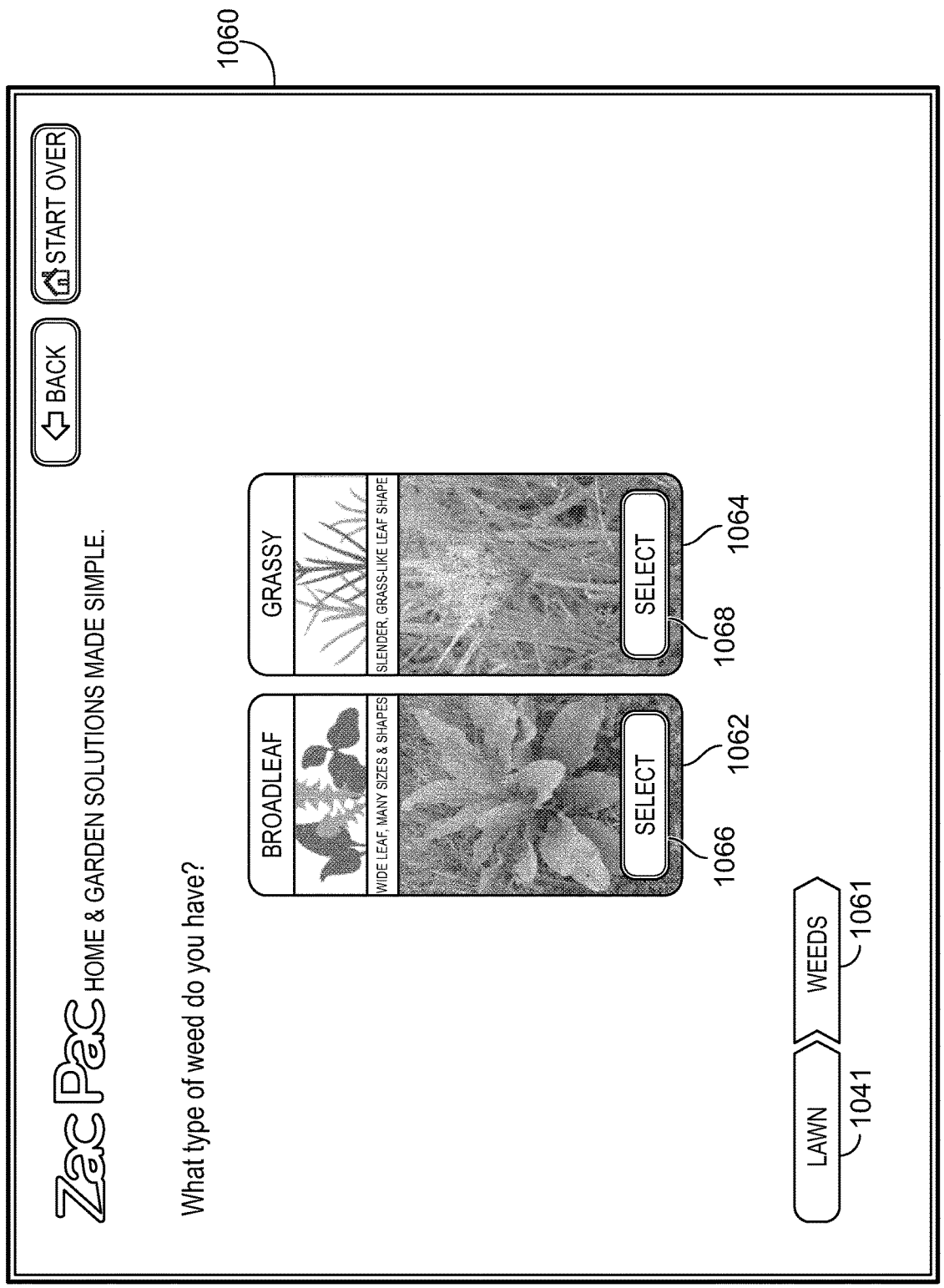

As an example, FIG. 13C depicts a screenshot of an exemplary problem interface 1040 associated with prompting the user to select a problem to be solved using the pest solutions application. In the illustrated embodiment, the user-selected treatment area is "lawn," as indicated by a lawn tab 1041 displayed on the problem interface 1040. Accordingly, the problem interface 1040 displays a plurality of possible lawn-related problems, including, for example, dead spots or brown spots (represented by a dead spots image 1042), insects (represented by a insects image 1044), and weeds (represented by a weeds image 1046). As will be appreciated, images and/or problems other than those illustrated in FIG. 13C are also contemplated in accordance with the principles and teachings described herein. FIG. 13C also illustrates a plurality of user-selectable problem options 1048, 1050, 1052, and that are displayed with, or overlapping, the problem images 1042, 1044, and 1046, respectively. As shown, each of the possible problems may also be labeled with textual descriptions. In some cases, the lawn tab 1041 may be a user-selectable option that allows the user to go back to the treatment area interface 1010.

At step 910, the processor receives, from the touchscreen display, a touch selection of one of the plurality of user-selectable problem options 1048-1052 presented by the problem interface 1040. In some embodiments, the method 900 continues to step 912, where based on said touch selection, the processor determines the problem associated with the selected problem option and identifies one or more problem categories associated with the determined problem. At step 912, the processor may retrieve information from the one or more databases (such as, e.g., the pest solutions database 820) in order to identify which problem categories are associated with the user-selected problem. In some cases, the processor can be configured to select only those problem categories that are known to be found in, or associated with, a geographical location of the user and/or the electronic device.

At step 914, for each identified category, the processor retrieves a category image representing said category, generates a graphical user interface comprising the retrieved category images presented in correspondence with a plurality of user-selectable category options, and provides said interface to the display for display thereon. In embodiments, the category images can include a photograph, a drawing, an icon, or any other representation of the respective category that will help the user readily recognize and identify the correct problem category. Each category image can be displayed adjacent to, or in conjunction with, a corresponding user-selectable category option, so that the user can easily make a selection once she identifies the correct one. In some embodiments, the processor retrieves the plurality of category images from the pest solutions database 820.

As an example, FIG. 13D depicts a screenshot of an exemplary problem category interface 1060 associated with prompting the user to identify a category associated with the problem to be solved using the pest solutions application. In the illustrated embodiment, the user-selected problem is "weeds," as indicated by a weeds tab 1061 displayed on the problem category interface 1060, next to the lawn tab 1041. Accordingly, the category interface 1060 displays a plurality of categories or types of weeds that may be found in one's lawn, including, for example, broadleaf (represented by a broadleaf image 1062) and grassy (represented by a grassy image 1064). As will be appreciated, images and/or categories other than those illustrated in FIG. 13D are also contemplated in accordance with the principles and teachings described herein. FIG. 13D also illustrates a plurality of user-selectable category options 1066 and 1068 that are displayed with, or overlapping, the category images 1062 and 1064, respectively. As shown, each of the possible categories may also be labeled with simple and/or more elaborative textual descriptions. In some cases, the weeds tab 1061 may be a user-selectable option that allows the user to go back to the problem interface 1040.

At step 916, the processor receives, from the touchscreen display, a touch selection of one of the user-selectable problem options 1062 and 1064 presented by the problem category interface 1060. The method 900 then continues to step 918, where based on said touch selection, the processor determines the category or type of problem associated with the selected category option and identifies one or more species associated with the determined category.

In other embodiments, for example, if the user-selected problem is not associated with intermediate categories, the method 900 can continue from step 910 directly to step 918 by identifying one or more species associated with the selected category. At step 918, the processor may retrieve information from the one or more databases (such as, e.g., the pest solutions database 820) in order to identify which species or pests are associated with the user-selected problem category. In some cases, the processor can be configured to select only those species that are known to be found in, or associated with, a geographical location of the user and/or the electronic device.

At step 920, for each identified species, the processor retrieves a species image representing said species or pest, generates a graphical user interface comprising the retrieved species images presented in correspondence with a plurality of user-selectable species options, and provides said interface to the display for display thereon. In embodiments, the species images can include a photograph, a drawing, an icon, or any other representation of the respective species that will help the user readily recognize and identify the exact species causing problems for the user. Each species image can be displayed adjacent to, or in conjunction with, a corresponding user-selectable species option, so that the user can easily make a selection once he identifies the correct species. In some embodiments, the processor retrieves the plurality of species images from the pest solutions database 820.

Figure 13E:
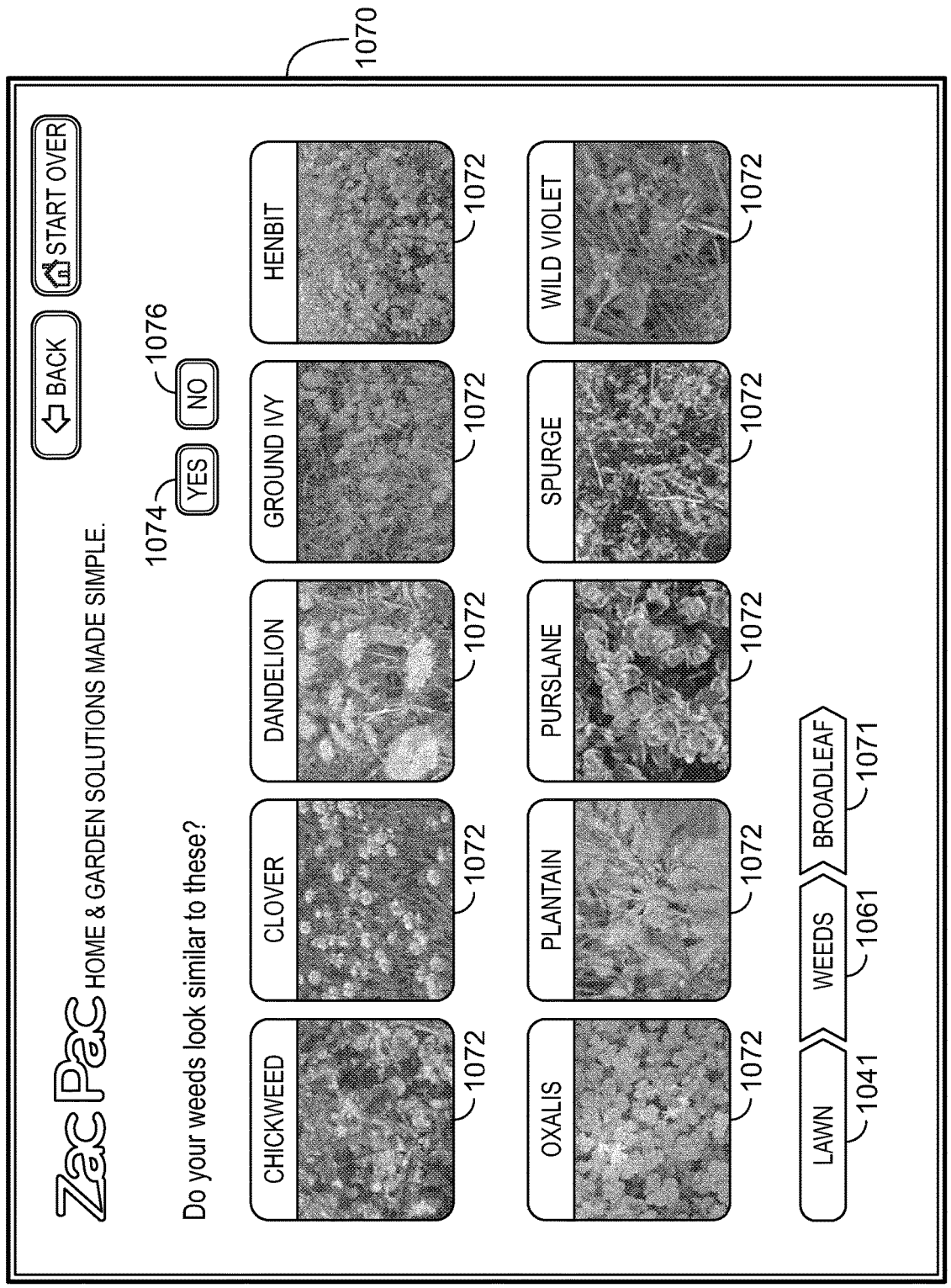

As an example, FIG. 13E depicts a screenshot of an exemplary species interface 1070 associated with prompting the user to select a species associated with the type of problem, and/or the general problem, to be solved using the pest solutions application. In the illustrated embodiment, the user-selected problem is "broadleaf weeds," as indicated by a broadleaf tab 1071 displayed on the species interface 1070, next to the weeds tab 1061. Accordingly, the species interface 1070 displays a plurality of species of weeds that are broadleaf and may be found in one's lawn, including, for example, chickweed, clover, dandelion, ground ivy, henbit, oxalis, plantain, purslane, spurge, and wild violet. Each of the species is represented by a corresponding one of a plurality of images 1072. As will be appreciated, images and/or species other than those illustrated in FIG. 13E are also contemplated in accordance with the principles and teachings described herein.

As illustrated, the interface 1070 asks the user whether the species affecting their problem area looks like any of the images 1072. If they do, the user can select a "yes" option 1074, and if they do not, the user can select a "no" option 1076. In other cases, the interface 1070 also includes a plurality of user-selectable species options (not shown) that are respectively displayed with, or overlapping, the plurality of species images 1072. As shown, each of the possible species may also be labeled with textual descriptions. In some cases, the broadleaf tab 1071 may be a user-selectable option that allows the user to go back to the problem category interface 1060. On some cases, the species interface 1070 can further include an "I'm not sure" option (not shown) for those users that still cannot identify the exact species affecting their problem area. The species interface 1070 can also include an "I have several" option (not shown) for those users that have more than one species or pest affecting their problem area. Selection of this option may take the user to another graphical user interface (not shown), where the user can select multiple species, or select one or more categories that group species together depending on, for example, the coverage provided by relevant pest solution products, and/or other factors.

At step 922, the processor receives, from the touchscreen display, a touch selection of, for example, the yes option 1074 presented by the species interface 1070, or in an alternative interface as described above. At step 924, based on said touch selection, the processor determines the species associated with the selected species option(s), or a species category encompassing the species, and identifies one or more pest solutions associated with the determined species or species category. In embodiments, the processor may retrieve information from the one or more databases in order to identify which pest solutions are associated with, or appropriate for treating, the user-selected species. In some cases, the processor may be configured to retrieve, from the pest solutions database 820, one or more product recommendations for treating the identified species or pest, including, for example, a first preferred product, a second preferred product, etc.

In some cases, the processor can be configured to select, from the list of product recommendations, only those pest solutions that are known to be available in, or permitted at, the location of the user and/or the electronic device. In such cases, the processor may be configured to retrieve, from the pesticide restrictions database 822, restriction information that is relevant to the relevant location and/or time of year and pertinent to the recommended products and/or the pesticides included therein. The restriction information may include geographic restrictions, seasonal restrictions, and/or government regulations, as described herein. Further, the processor may be configured to retrieve, from the inventory database 818, inventory information for the products that are recommended for the identified pest and permitted in the current location. Thus, based on the product recommendations, restriction information, and/or inventory information, the processor can identify a pest solution or product that is most appropriate for combating or treating the exact problem or pest specified by the user using the pest solutions application.

At step 926, the processor retrieves pest solution information related to the identified product, generates a graphical user interface comprising the retrieved pest solution information, and provides said interface to the display for display thereon. In some embodiments, for example where the electronic device is the dispensing kiosk 700, the graphical user interface further includes an option to dispense the identified product using a product dispenser of the electronic device. In embodiments, the pest solution information can be retrieved from the pest solutions database 820, the inventory database 818, and/or the pesticide restrictions database 822. The pest solution information can include usage/application information (e.g., tips on how and when to apply the product), one or more product descriptors (e.g., color of packaging, size, quantity, etc.), coverage information (e.g., how much square-footage can be covered by one application), restriction information (e.g., governmental regulations, seasonal restrictions, and the like), and other useful information related to the product.

In some embodiments, the pest solution information includes weather-related information, such as, e.g., an upcoming forecast for the user's geographical location that may affect application of the selected product. In such cases, the method 900 may further include receiving and/or retrieving weather forecasts from a remote server and identifying, based on, for example, information stored in the pest solutions database 820, aspects of the product recommendation that may be impacted by the retrieved weather forecast (such as, e.g., usage instructions and the type of products recommended). For example, if the short-term forecast for the user's location predicts rain for the next few days, the pest solution information may include a suggestion to not apply the product in the next few days and to wait until after rainstorm passes. As another example, the pest solution information may further include a recommendation to apply a fungicide if the weather forecast predicts a long stretch of wet and/or hot weather.

Figure 13F:
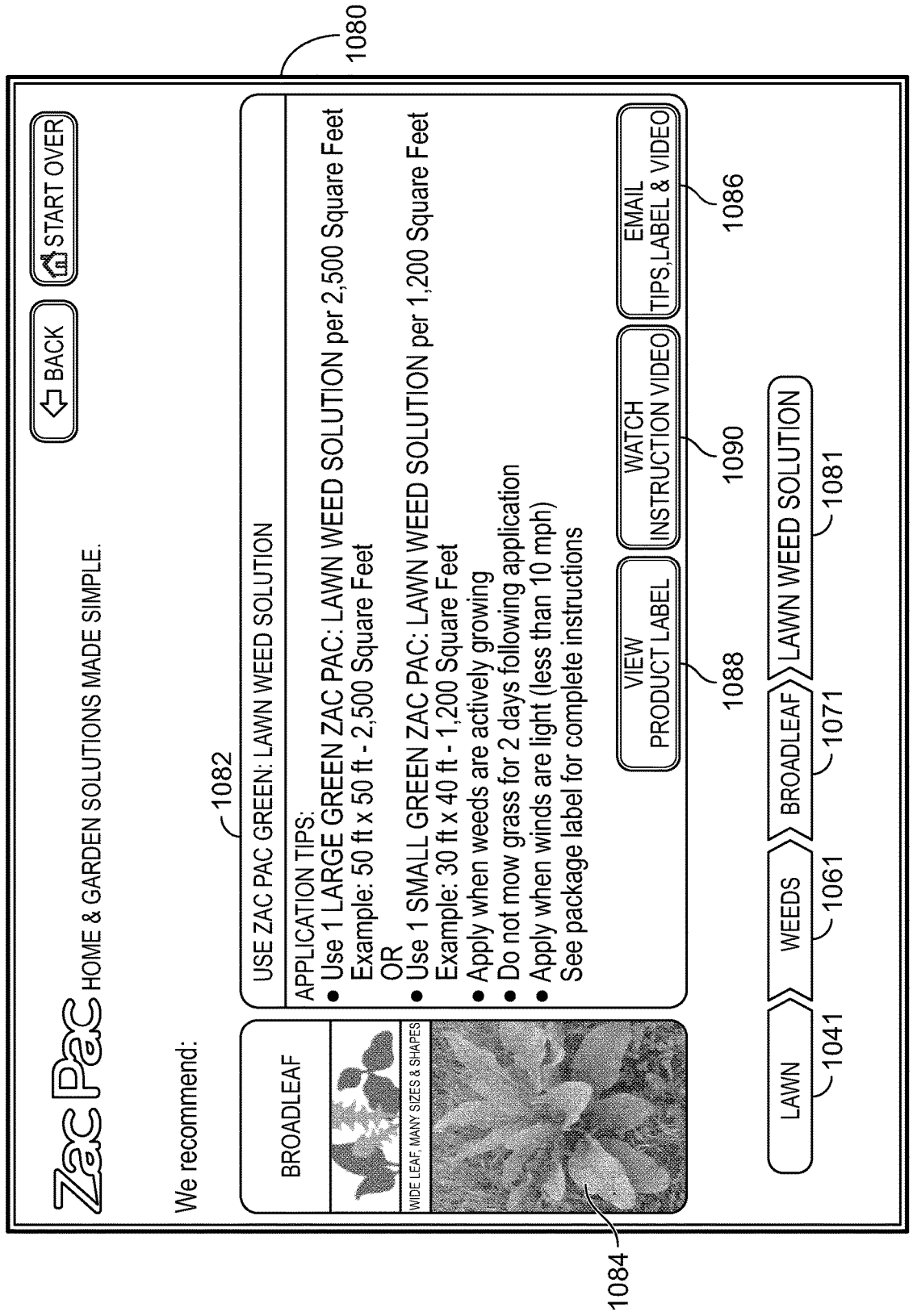

As an example, FIG. 13F depicts a screenshot of an exemplary product recommendation interface 1080 associated with recommending a pest solution that is appropriate for the user-specified problem or pest, using the pest solutions application. In the illustrated embodiment, the user has selected the "yes" option 1074 in the species interface 1070, which corresponds to a lawnweed species category, as indicated by a lawnweed solution tab 1081 displayed on the recommendation interface 1080, next to the broadleaf tab 1071. Accordingly, the recommendation interface 1080 displays a product recommendation 1082 that is pertinent to combating a lawnweed problem and comprises the pest solution information retrieved by the processor at step 926. The recommendation 1082 can be displayed adjacent to an image 1084 of the species or species category selected at step 922, so the user knows that the recommendation is indeed pertinent to the user-selected problem. Displaying the image 1084 of the selected species can also serve as a safeguard in case the user accidentally selected the wrong species on the species interface 1070. As will be appreciated, images and/or information other than those illustrated in FIG. 13F are also contemplated in accordance with the principles and teachings described herein.

In some embodiments, the recommendation interface 1080 can further include a user-selectable email option 1086, a user-selectable "product label" option 1088 to view the product label of the selected product, a user-selectable "watch video" option 1090 to view an instructional video on how to use the selected product, and a user-selectable dispense option (not shown). Upon user selection of the email option 1086, the user may be prompted to enter an email address. The processor may generate an email comprising the pest solution information and send the generated email to the email address supplied by the user. Upon user selection of the dispense option, the pest solution or product presented by the recommendation 1082 may be dispensed from an opening of the electronic device (e.g., the opening 705 of the kiosk 700). In some cases, the lawnweed solution tab 1081 may be a user-selectable option that allows the user to go back to the species interface 1070.

Figure 13G:
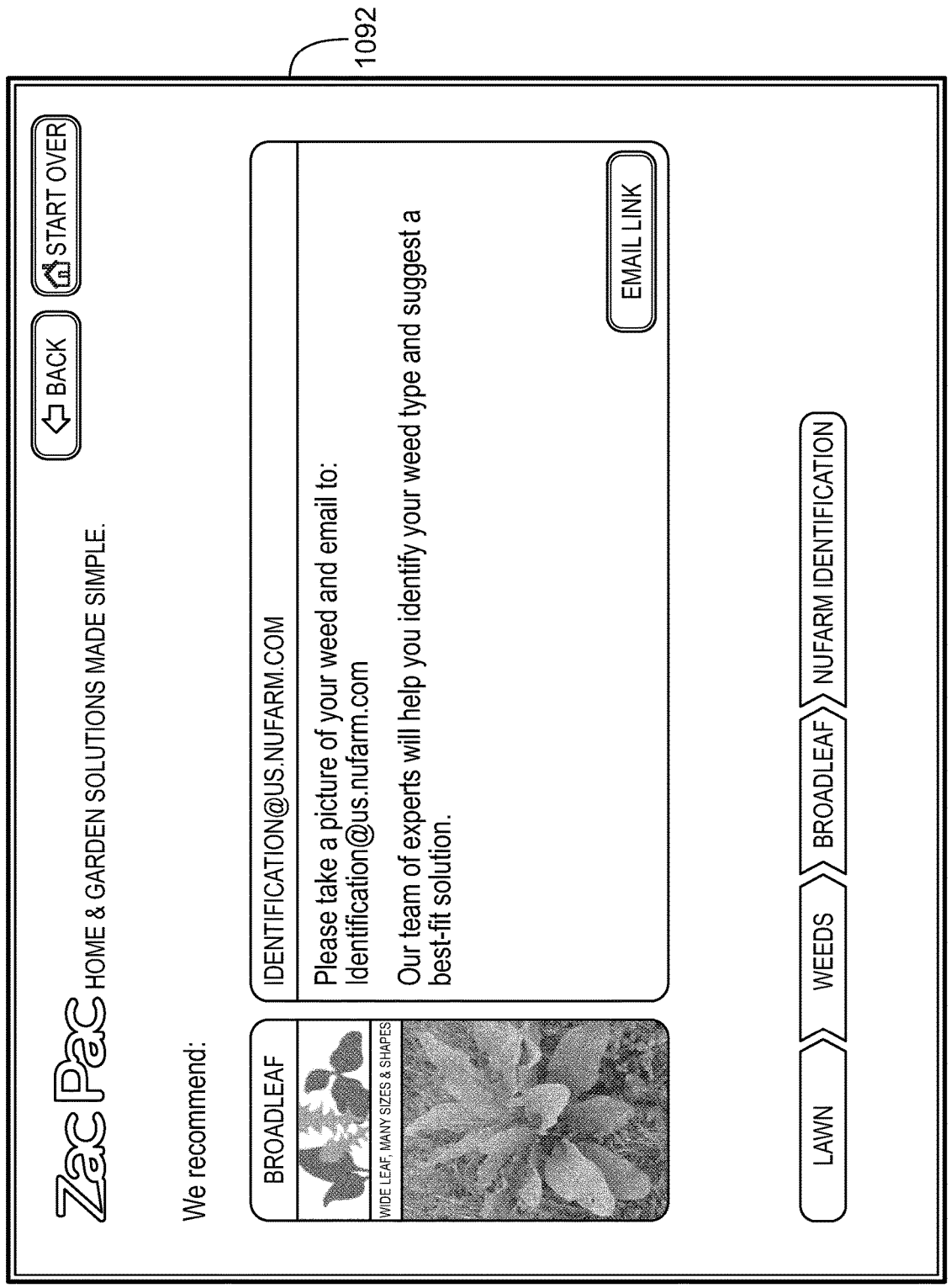
Figure 14A:
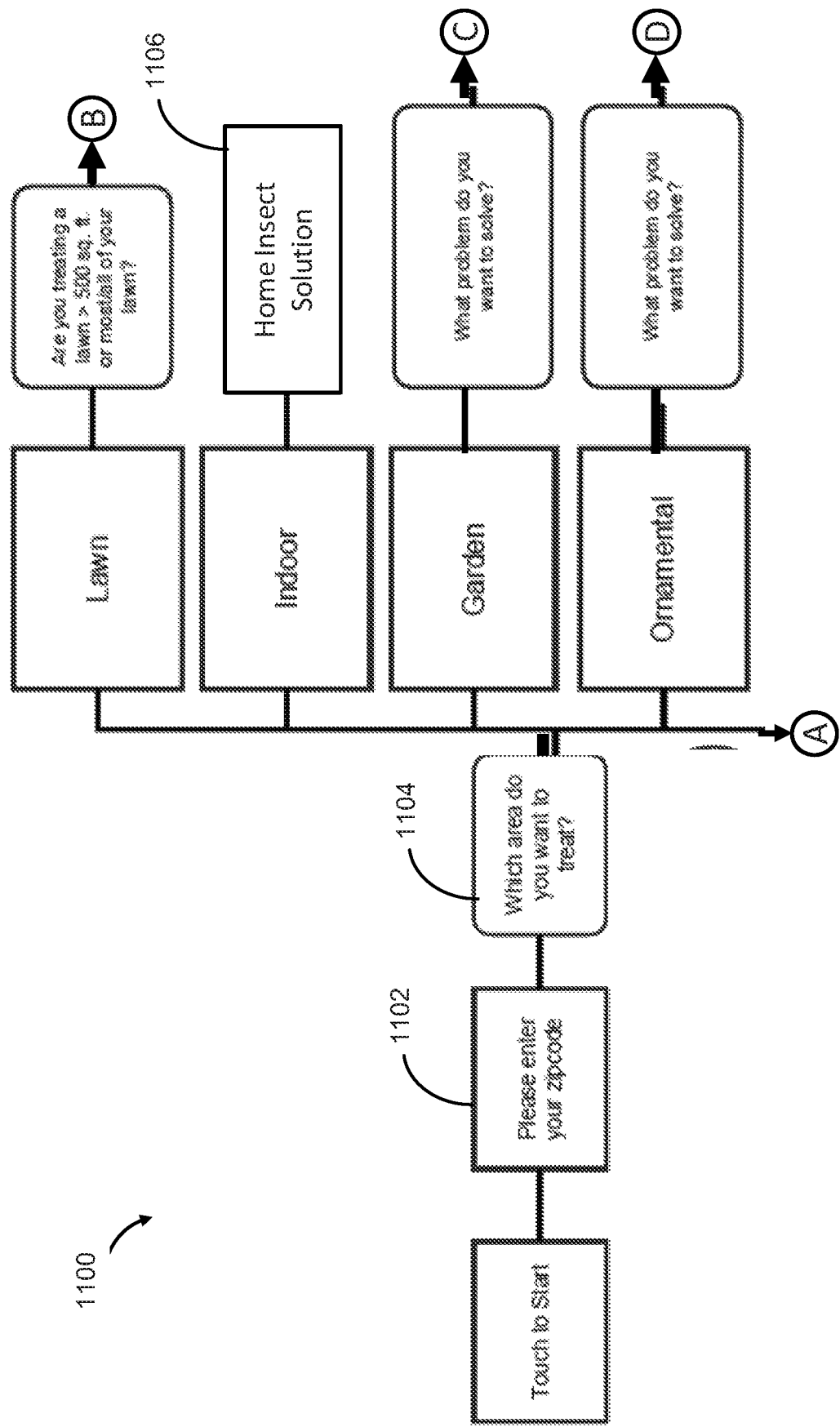
Figure 14C:
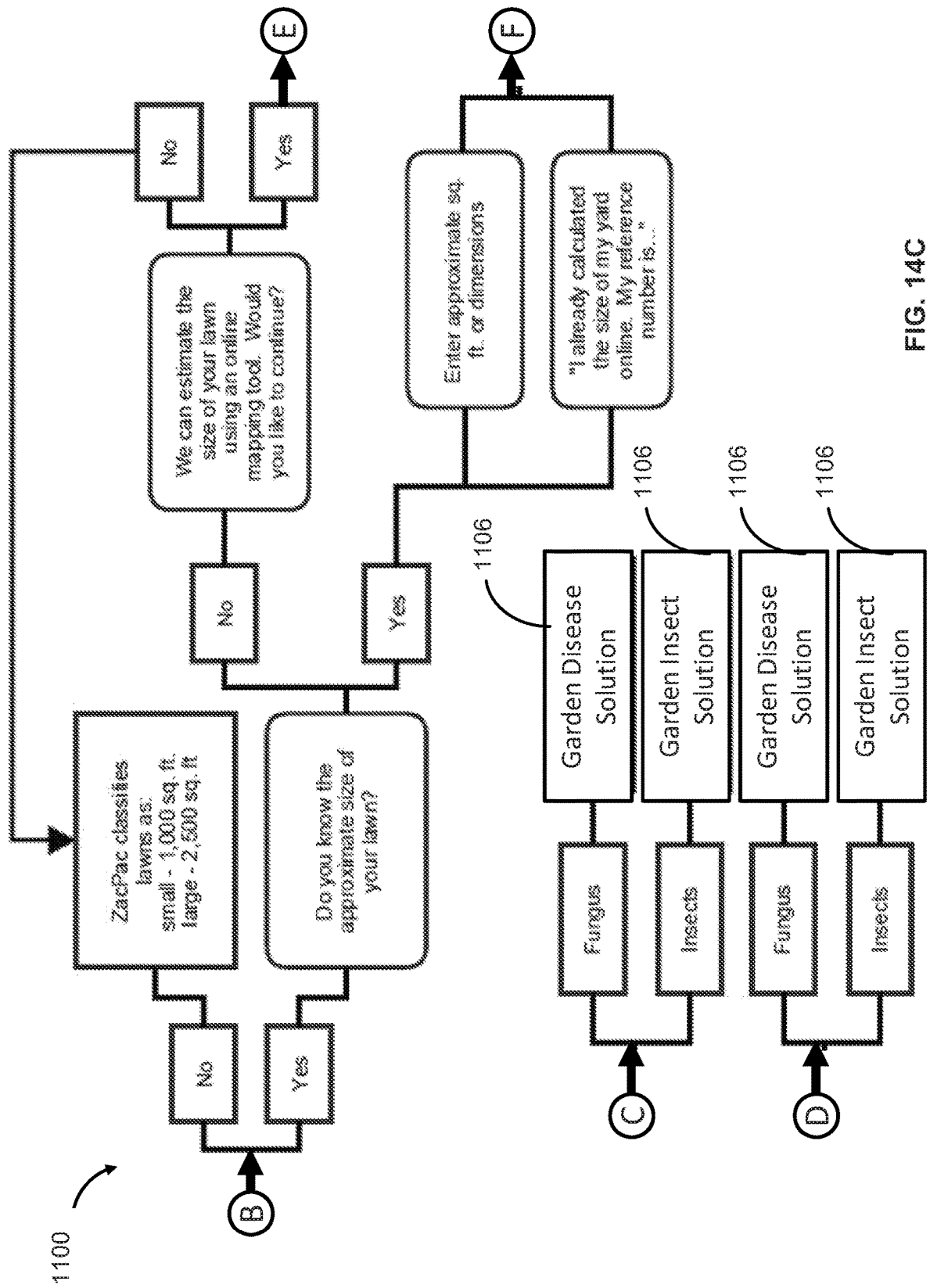
Figure 14D:
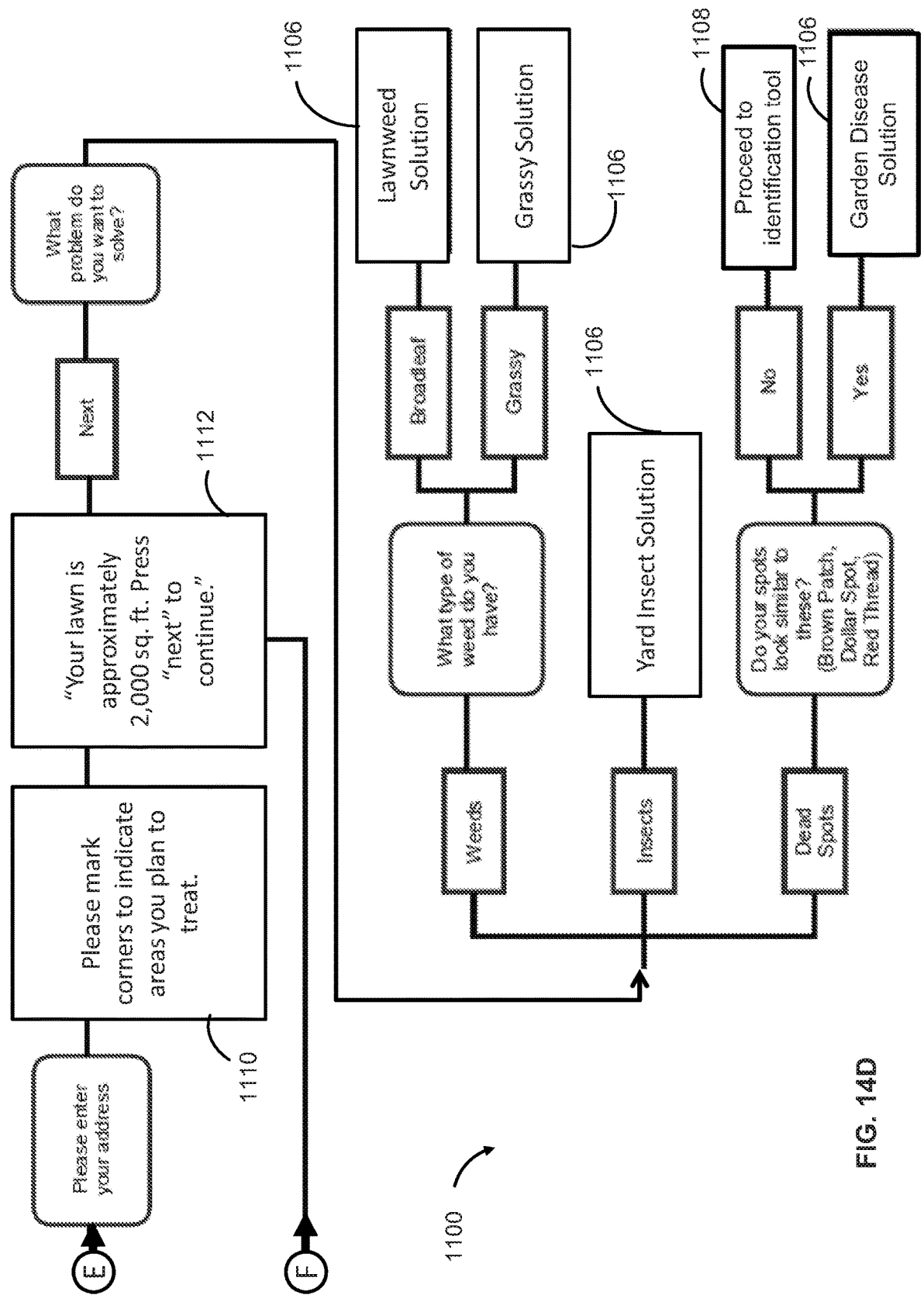

FIG. 13G depicts a screenshot of an exemplary identification interface 1092 that may be displayed if the user selects the "no" option 1076 on the species interface 1070 in FIG. 13E, in accordance with embodiments. For example, the user may select the no option 1076 if none of the species images 1072 look familiar or look like the user's problem.

The identification interface 1092 asks the user to take a picture of the unidentified problem and email it the company for expert review.

FIGS. 14A through 14D depict a flow diagram of an example decision-making sequence 1100 for guiding a user to an appropriate pest solution using a graphical user interface of a pest solutions kiosk in accordance with embodiments. In some embodiments, the sequence 1100 can be associated with, or correspond to, one or more of the graphical user interfaces depicted in FIGS. 13A-13G, the method 900 shown in FIG. 12, and/or one or more of the applications 834, including the pest solutions application 836 and/or the mapping application 838, as described herein. In some cases, the sequence 1100 is a computer-implemented method comprising, for example, at step 1102, obtaining, using a processor of the kiosk (e.g., the kiosk 801), location information for a treatment area in need of a pest solution, the location information being obtained from at least one of a remote server or user inputs via the touchscreen display (e.g., user input of a zip code).

The sequence 1100 further includes, at step 1104, displaying, on a touchscreen of the kiosk (e.g., the display 802), one or more user prompts for requesting information regarding the treatment area (e.g., displaying the question "Which area do you want to treat?" and a number of selectable options, such as, lawn, indoor, garden, ornamental, woods/brush, hardscape), the one or more user prompts including photographic images representing a subject matter of each prompt (e.g., images associated with lawn, indoor, garden, ornamental, woods/brush, hardscape).

Though not shown, the sequence 1100 can also include, based on the location information, retrieving, from a database, restriction information associated with the treatment area, the restriction information including at least one of government regulations, seasonal restrictions, or geographical restrictions; and based on the location information, retrieving, by the processor, weather information associated with the treatment area from a remote server. At step 1106, the sequence 1100 includes determining, by a processor, a pest solution based on the information received in response to the one or more user prompts and at least one of the restriction information, a product availability, or the weather information, the pest solution including a recommended product and usage instructions for the same (e.g., home insect solution to treat indoor pest problems, lawnweed solution to treat weeds in the lawn, etc.). The sequence 1100 can also include displaying, on the touchscreen display, the pest solution and an option to dispense the recommended product (e.g., as shown in FIG. 13F). If the user is unable to identify the problem, the sequence 1100 can also include, at step 1108, displaying an option to proceed to an identification tool (e.g., as shown in FIG. 13G).

In some cases, after, or as part of, the step 1102 for obtaining location information, the sequence 1100 continues to step 1110, which includes displaying an interactive map on the touchscreen, and receiving, via the touchscreen, one or more user inputs outlining the treatment area on the interactive map (e.g., the user indicates the area to be treated by marking the corners of the area on the map), for example, as shown by map interface 1111 in FIG. 15A. In such cases, the sequence 1100 can further include, step 1112, calculating, by the processor, a surface area of the treatment area based on the location information (e.g., the marked or outlined area), displaying the calculated surface area, and determining, by the processor, a quantity of the recommended product required based on the calculated surface area, for example, as shown by interface 1113 in FIG. 15B.

More specifically, the interface 1111 shown in FIG. 15A prompts the user to mark or draw the corners 1114 of the user's problem area. Once all corners 1114 are marked, the processor connects the corners to estimate a shape of the treatment area 1115. For example, the processor can connect the marked corners to form rectangles or other geometric shapes (e.g., triangles, squares, etc.) and can calculate an area for each shape using known techniques. The calculated areas can then be summed to estimate a total surface area for the treatment area 1115. The estimated treatment area 1115 is then displayed on the interface 1113 with the calculated surface area. As will be appreciated, other techniques may be used to calculate or estimate a surface area of the user's treatment area.

Any process descriptions or blocks in the figures, such as FIGS. 12 and 14A-14D, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and protected by the following claims.

The invention claimed is:

1. A pest solution dispensing machine, comprising:
a user interface comprising a display in communication with a processor, said display being configured to display a first set of prompts related to selection of a pest solution;
said user interface being configured to receive a first user selection of at least one of the displayed prompts;
a memory in communication with the processor and configured to store pest solution criteria;
said processor being configured to identify a selection of one or more pests based on the first user selection and identify a second set of prompts related to the one or more pests based on the stored pest solution criteria, wherein said second set of prompts is displayed on said display and said user interface is configured to receive a second user selection of at least one of said second set of prompts;
a plurality of pre-packaged pest solution products stored within the machine and comprising a plurality of different pest solutions, each pest solution product containing a pre-measured amount of a selected one of the different pest solutions;
said processor being further configured to identify one or more of said pre-packaged pest solution products based on the second user selection;
and
a product dispenser in communication with the processor and configured to dispense a selected one of the one or more pre-packaged pest solution products identified by the processor.

2. The machine of claim 1, wherein each pest solution product has a uniform size and shape.

3. The machine of claim 1, wherein each pest solution product contains a concentrated pesticide.

4. The machine of claim 1, wherein the user interface comprises a touchscreen and at least one user selection is a touch input.

5. The machine of claim 1, wherein said display is further configured to display a user-selectable option to dispense said selected pest solution product, and user selection of said user-selectable option is an identification for said product dispenser to dispense the pre-packaged amount of said selected product.

6. The machine of claim 1, wherein at least one of said first and second set of prompts includes images representing potential pests for treatment.

7. The machine of claim 1, wherein the first set of prompts provides a choice of pest categories, the first user selection identifying a selected one of the pest categories, and the second set of prompts provides a choice of pest types associated with the selected pest category, the second user selection identifying a selected one of the pest types.

8. A pest solution dispensing machine, comprising:
a plurality of pre-packaged pest solution products stored within the machine and comprising a plurality of different pest solutions, each pest solution product containing a pre-measured amount of a selected one of the plurality of different pest solutions;
a user interface comprising a display in communication with a processor,
said display being configured to display a plurality of prompts related to selection of a pest solution;
said user interface being configured to receive a user selection of one of the displayed prompts,
said processor configured to identify one or more of said pre-packaged pest solution products based on the user selection; and
a product dispenser in communication with the processor and configured to dispense a selected one of the one or more pre-packaged pest solution products identified by the processor.

9. The machine of claim 8, wherein each pest solution product has a uniform size and shape.

10. The machine of claim 8, wherein each pest solution product contains a concentrated pesticide.

11. The machine of claim 8, wherein one or more of said prompts includes images representing potential pests for treatment.

12. The machine of claim 8, wherein said displayed prompts includes a first set of prompts and a second set of prompts, the user selection corresponds to one of said first set of prompts.

13. The machine of claim 12, wherein said processor is further configured to be in communication with a memory device and identify said second set of prompts based on the user selection and pest solution criteria retrieved from the memory device.

14. The machine of claim 12, wherein said user interface is further configured to receive a second user selection of at least one of said second set of prompts, said processor identifying the selected product based on said second user selection.

15. The machine of claim 14, wherein said first set of prompts provides a choice of pest categories, and the user selection identifies a selected one of the pest categories.

16. The machine of claim 15, wherein said second set of prompts provides a choice of pest types associated with the selected pest category, and the second user selection identifies a selected one of the pest types.

17. The machine of claim 8, wherein the user interface comprises a touchscreen and at least one of said user selection is a touch input.

18. The machine of claim 8, wherein said display is further configured to display a user-selectable option to dispense said selected pest solution product, and user selection of said user-selectable option is an identification for said product dispenser to dispense the pre-packaged amount of said selected product.

19. The machine of claim 8, wherein said display is further configured to display information related to the selected pest solution product, including instructions for using the product.

* * * * *